US007440252B2

(12) United States Patent
Anthony

(10) Patent No.: US 7,440,252 B2
(45) Date of Patent: Oct. 21, 2008

(54) CONNECTOR RELATED STRUCTURES INCLUDING AN ENERGY CONDITIONER

(75) Inventor: Anthony Anthony, Erie, PA (US)

(73) Assignee: X2Y Attenuators, LLC, Erie, PA (US)

( * ) Notice: Subject to any disclaimer, the term of this patent is extended or adjusted under 35 U.S.C. 154(b) by 450 days.

(21) Appl. No.: 10/554,243

(22) PCT Filed: Jun. 1, 2004

(86) PCT No.: PCT/US2004/014539

§ 371 (c)(1),
(2), (4) Date: Oct. 25, 2005

(87) PCT Pub. No.: WO2005/002018

PCT Pub. Date: Jan. 6, 2005

(65) Prior Publication Data

US 2006/0139836 A1 Jun. 29, 2006

Related U.S. Application Data

(60) Provisional application No. 60/534,984, filed on Jan. 9, 2004, provisional application No. 60/523,098, filed on Nov. 19, 2003, provisional application No. 60/505,874, filed on Sep. 26, 2003, provisional application No. 60/502,617, filed on Sep. 15, 2003, provisional application No. 60/500,347, filed on Sep. 5, 2003, provisional application No. 60/473,914, filed on May 29, 2003.

(51) Int. Cl.
*H02H 9/00* (2006.01)

(52) U.S. Cl. ...................................................... 361/118

(58) Field of Classification Search .................. 361/118
See application file for complete search history.

(56) References Cited

U.S. PATENT DOCUMENTS

| | | | |
|---|---|---|---|
| 3,240,621 | A | 3/1966 | Flower, Jr. et al. |
| 3,343,034 | A | 9/1967 | Ovshinsky |
| 3,573,677 | A | 4/1971 | Detar |
| 3,736,471 | A | 5/1973 | Donze et al. |
| 3,742,420 | A | 6/1973 | Hamden, Jr. |
| 3,790,858 | A | 2/1974 | Brancaleone et al. |
| 3,842,374 | A | 10/1974 | Schlicke |
| 4,023,071 | A | 5/1977 | Fussell |
| 4,119,084 | A | 10/1978 | Eckels |
| 4,135,132 | A | 1/1979 | Tafjord |
| 4,139,783 | A | 2/1979 | Engeler |
| 4,191,986 | A | 3/1980 | ta Huang et al. |

(Continued)

FOREIGN PATENT DOCUMENTS

DE 197 28 692 A1 1/1999

(Continued)

OTHER PUBLICATIONS

PCT International Search Report for PCT/US01/48861.

(Continued)

*Primary Examiner*—Stephen W Jackson
(74) *Attorney, Agent, or Firm*—Neifeld IP Law, PC

(57) ABSTRACT

The invention provides electrical energy conditioners particularly useful for power applications. Internal structure of the energy conditioners may be included as components of connectors or electrical devices.

20 Claims, 11 Drawing Sheets

U.S. PATENT DOCUMENTS

| | | | |
|---|---|---|---|
| 4,198,613 | A | 4/1980 | Whitley |
| 4,259,604 | A | 3/1981 | Aoki |
| 4,262,317 | A | 4/1981 | Baumbach |
| 4,275,945 | A | 6/1981 | Krantz et al. |
| 4,292,558 | A | 9/1981 | Flick et al. |
| 4,308,509 | A | 12/1981 | Tsuchiya et al. |
| 4,320,364 | A | 3/1982 | Sakamoto et al. |
| 4,335,417 | A | 6/1982 | Sakshaug et al. |
| 4,353,044 | A | 10/1982 | Nossek |
| 4,366,456 | A | 12/1982 | Ueno et al. |
| 4,384,263 | A | 5/1983 | Neuman et al. |
| 4,394,639 | A | 7/1983 | McGalliard |
| 4,412,146 | A | 10/1983 | Futterer et al. |
| 4,494,092 | A | 1/1985 | Griffin |
| 4,533,931 | A | 8/1985 | Mandai et al. |
| 4,553,114 | A | 11/1985 | English et al. |
| 4,563,659 | A | 1/1986 | Sakamoto |
| 4,586,104 | A | 4/1986 | Standler |
| 4,587,589 | A | 5/1986 | Marek |
| 4,590,537 | A | 5/1986 | Sakamoto |
| 4,592,606 | A | 6/1986 | Mudra |
| 4,612,140 | A | 9/1986 | Mandai |
| 4,612,497 | A | 9/1986 | Ulmer |
| 4,636,752 | A | 1/1987 | Saito |
| 4,682,129 | A | 7/1987 | Bakermans et al. |
| 4,685,025 | A | 8/1987 | Carlomagno |
| 4,688,151 | A | 8/1987 | Kraus et al. |
| 4,694,265 | A | 9/1987 | Kupper |
| 4,698,721 | A | 10/1987 | Warren |
| 4,703,386 | A | 10/1987 | Speet et al. |
| 4,712,062 | A | 12/1987 | Takamine |
| 4,713,540 | A | 12/1987 | Gilby et al. |
| 4,720,760 | A | 1/1988 | Starr |
| 4,746,557 | A | 5/1988 | Sakamoto et al. |
| 4,752,752 | A | 6/1988 | Okubo |
| 4,760,485 | A | 7/1988 | Ari et al. |
| 4,772,225 | A | 9/1988 | Ulery |
| 4,777,460 | A | 10/1988 | Okubo |
| 4,780,598 | A | 10/1988 | Fahey et al. |
| 4,782,311 | A | 11/1988 | Ookubo |
| 4,789,847 | A | 12/1988 | Sakamoto et al. |
| 4,793,058 | A | 12/1988 | Venaleck |
| 4,794,485 | A | 12/1988 | Bennett |
| 4,794,499 | A | 12/1988 | Ott |
| 4,795,658 | A | 1/1989 | Kano et al. |
| 4,799,070 | A | 1/1989 | Nishikawa |
| 4,801,904 | A | 1/1989 | Sakamoto et al. |
| 4,814,295 | A | 3/1989 | Mehta |
| 4,814,938 | A | 3/1989 | Arakawa et al. |
| 4,814,941 | A | 3/1989 | Speet et al. |
| 4,819,126 | A | 4/1989 | Kornrumpf et al. |
| 4,845,606 | A | 7/1989 | Herbert |
| 4,847,730 | A | 7/1989 | Konno et al. |
| 4,904,967 | A | 2/1990 | Morii et al. |
| 4,908,586 | A | 3/1990 | Kling et al. |
| 4,908,590 | A | 3/1990 | Sakamoto et al. |
| 4,924,340 | A | 5/1990 | Sweet |
| 4,942,353 | A | 7/1990 | Herbert et al. |
| 4,967,315 | A | 10/1990 | Schelhorn |
| 4,978,906 | A | 12/1990 | Herbert et al. |
| 4,990,202 | A | 2/1991 | Murata et al. |
| 4,999,595 | A | 3/1991 | Azumi et al. |
| 5,029,062 | A | 7/1991 | Capel |
| 5,034,709 | A | 7/1991 | Azumi et al. |
| 5,034,710 | A | 7/1991 | Kawaguchi |
| 5,051,712 | A | 9/1991 | Naito et al. |
| 5,059,140 | A | 10/1991 | Philippson et al. |
| 5,065,284 | A | 11/1991 | Hernandez |
| 5,073,523 | A | 12/1991 | Yamada et al. |
| 5,079,069 | A | 1/1992 | Howard et al. |
| 5,079,223 | A | 1/1992 | Maroni |
| 5,079,669 | A | 1/1992 | Williams |
| 5,089,688 | A | 2/1992 | Fang et al. |
| 5,105,333 | A | 4/1992 | Yamano et al. |
| 5,107,394 | A | 4/1992 | Naito et al. |
| 5,109,206 | A | 4/1992 | Carlile |
| 5,140,297 | A | 8/1992 | Jacobs et al. |
| 5,140,497 | A | 8/1992 | Kato et al. |
| 5,142,430 | A | 8/1992 | Anthony |
| 5,148,005 | A | 9/1992 | Fang et al. |
| 5,155,655 | A | 10/1992 | Howard et al. |
| 5,161,086 | A | 11/1992 | Howard et al. |
| 5,167,483 | A | 12/1992 | Gardiner |
| 5,173,670 | A | 12/1992 | Naito et al. |
| 5,179,362 | A | 1/1993 | Okochi et al. |
| 5,181,859 | A | 1/1993 | Foreman et al. |
| 5,186,647 | A | 2/1993 | Denkmann et al. |
| 5,208,502 | A | 5/1993 | Yamashita et al. |
| 5,219,812 | A | 6/1993 | Doi et al. |
| 5,220,480 | A | 6/1993 | Kershaw, Jr. et al. |
| 5,236,376 | A | 8/1993 | Cohen |
| 5,243,308 | A | 9/1993 | Shusterman et al. |
| 5,251,092 | A | 10/1993 | Brady et al. |
| 5,257,950 | A | 11/1993 | Lenker et al. |
| 5,261,153 | A | 11/1993 | Lucas |
| 5,262,611 | A | 11/1993 | Danysh et al. |
| 5,268,810 | A | 12/1993 | DiMarco et al. |
| 5,290,191 | A | 3/1994 | Foreman et al. |
| 5,299,956 | A | 4/1994 | Brownell et al. |
| 5,300,760 | A | 4/1994 | Batliwalla et al. |
| 5,310,363 | A | 5/1994 | Brownell et al. |
| 5,311,408 | A | 5/1994 | Ferchau et al. |
| 5,321,373 | A | 6/1994 | Shusterman et al. |
| 5,321,573 | A | 6/1994 | Person et al. |
| 5,326,284 | A | 7/1994 | Bohbot et al. |
| 5,337,028 | A | 8/1994 | White |
| 5,353,189 | A | 10/1994 | Tomlinson |
| 5,353,202 | A | 10/1994 | Ansell et al. |
| 5,357,568 | A | 10/1994 | Pelegris |
| 5,362,249 | A | 11/1994 | Carter |
| 5,362,254 | A | 11/1994 | Siemon et al. |
| 5,378,407 | A | 1/1995 | Chandler et al. |
| 5,382,928 | A | 1/1995 | Davis et al. |
| 5,382,938 | A | 1/1995 | Hansson et al. |
| 5,386,335 | A | 1/1995 | Amano et al. |
| 5,396,201 | A | 3/1995 | Ishizaki et al. |
| 5,401,952 | A | 3/1995 | Sugawa |
| 5,405,466 | A | 4/1995 | Naito et al. |
| 5,414,393 | A | 5/1995 | Rose et al. |
| 5,414,587 | A | 5/1995 | Kiser et al. |
| 5,420,553 | A | 5/1995 | Sakamoto et al. |
| 5,432,484 | A | 7/1995 | Klas et al. |
| 5,446,625 | A | 8/1995 | Urbish et al. |
| 5,450,278 | A | 9/1995 | Lee et al. |
| 5,451,919 | A | 9/1995 | Chu et al. |
| RE35,064 | E | 10/1995 | Hernandez |
| 5,455,734 | A | 10/1995 | Foreman et al. |
| 5,461,351 | A | 10/1995 | Shusterman |
| 5,463,232 | A | 10/1995 | Yamashita et al. |
| 5,471,035 | A | 11/1995 | Holmes |
| 5,477,933 | A | 12/1995 | Nguyen |
| 5,481,238 | A | 1/1996 | Carsten et al. |
| 5,483,407 | A | 1/1996 | Anastasio et al. |
| 5,488,540 | A | 1/1996 | Hatta |
| 5,491,299 | A | 2/1996 | Naylor et al. |
| 5,493,260 | A | 2/1996 | Park |
| 5,495,180 | A | 2/1996 | Huang et al. |
| 5,500,629 | A | 3/1996 | Meyer |
| 5,500,785 | A | 3/1996 | Funada |
| 5,512,196 | A | 4/1996 | Mantese et al. |
| 5,531,003 | A | 7/1996 | Seifried et al. |
| 5,534,837 | A | 7/1996 | Brandt |
| 5,535,101 | A | 7/1996 | Miles et al. |
| 5,536,978 | A | 7/1996 | Cooper et al. |

| | | | |
|---|---|---|---|
| 5,541,482 | A | 7/1996 | Siao |
| 5,544,002 | A | 8/1996 | Iwaya et al. |
| 5,546,058 | A | 8/1996 | Azuma et al. |
| 5,548,255 | A | 8/1996 | Spielman |
| 5,555,150 | A | 9/1996 | Newman, Jr. |
| 5,568,348 | A | 10/1996 | Foreman et al. |
| 5,570,278 | A | 10/1996 | Cross |
| 5,583,359 | A | 12/1996 | Ng et al. |
| 5,586,007 | A | 12/1996 | Funada |
| 5,592,391 | A | 1/1997 | Muyshondt et al. |
| 5,612,657 | A | 3/1997 | Kledzik |
| 5,614,881 | A | 3/1997 | Duggal et al. |
| 5,619,079 | A | 4/1997 | Wiggins et al. |
| 5,624,592 | A | 4/1997 | Paustian |
| 5,640,048 | A | 6/1997 | Selna |
| 5,645,746 | A | 7/1997 | Walsh |
| 5,647,766 | A | 7/1997 | Nguyen |
| 5,647,767 | A | 7/1997 | Scheer et al. |
| 5,668,511 | A | 9/1997 | Furutani et al. |
| 5,682,303 | A | 10/1997 | Goad |
| 5,692,298 | A | 12/1997 | Goetz et al. |
| 5,700,167 | A | 12/1997 | Pharney et al. |
| 5,708,553 | A | 1/1998 | Hung |
| 5,719,450 | A | 2/1998 | Vora |
| 5,719,477 | A | 2/1998 | Tomihari |
| 5,719,750 | A | 2/1998 | Iwane |
| 5,751,539 | A | 5/1998 | Stevenson et al. |
| 5,767,446 | A | 6/1998 | Ha et al. |
| 5,789,999 | A | 8/1998 | Barnett et al. |
| 5,790,368 | A | 8/1998 | Naito et al. |
| 5,796,568 | A | 8/1998 | Baiatu |
| 5,796,595 | A | 8/1998 | Cross |
| 5,797,770 | A | 8/1998 | Davis et al. |
| 5,808,873 | A | 9/1998 | Celaya et al. |
| 5,825,084 | A | 10/1998 | Lau et al. |
| 5,825,628 | A | 10/1998 | Garbelli et al. |
| 5,828,093 | A | 10/1998 | Naito et al. |
| 5,828,272 | A | 10/1998 | Romerein et al. |
| 5,828,555 | A | 10/1998 | Itoh |
| 5,831,489 | A | 11/1998 | Wire |
| 5,834,992 | A | 11/1998 | Kato et al. |
| 5,838,216 | A | 11/1998 | White et al. |
| 5,867,361 | A | 2/1999 | Wolf et al. |
| 5,870,272 | A | 2/1999 | Seifried et al. |
| 5,875,099 | A | 2/1999 | Maesaka et al. |
| 5,880,925 | A | 3/1999 | DuPre et al. |
| 5,889,445 | A | 3/1999 | Ritter et al. |
| 5,895,990 | A | 4/1999 | Lau |
| 5,898,403 | A | 4/1999 | Saitoh et al. |
| 5,898,562 | A | 4/1999 | Cain et al. |
| 5,905,627 | A | 5/1999 | Brendel et al. |
| 5,907,265 | A | 5/1999 | Sakuragawa et al. |
| 5,908,151 | A | 6/1999 | Elias |
| 5,909,155 | A | 6/1999 | Anderson et al. |
| 5,909,350 | A | 6/1999 | Anthony |
| 5,910,755 | A | 6/1999 | Mishiro et al. |
| 5,912,809 | A | 6/1999 | Steigerwald et al. |
| 5,917,388 | A | 6/1999 | Tronche et al. |
| 5,926,377 | A | 7/1999 | Nakao et al. |
| 5,928,076 | A | 7/1999 | Clements et al. |
| 5,955,930 | A | 9/1999 | Anderson et al. |
| 5,959,829 | A | 9/1999 | Stevenson et al. |
| 5,959,846 | A | 9/1999 | Noguchi et al. |
| 5,969,461 | A | 10/1999 | Anderson et al. |
| 5,977,845 | A | 11/1999 | Kitahara |
| 5,978,231 | A | 11/1999 | Tohya et al. |
| 5,980,718 | A | 11/1999 | Van Konynenburg et al. |
| 5,995,352 | A | 11/1999 | Gumley |
| 5,999,067 | A | 12/1999 | D'Ostillo |
| 5,999,398 | A | 12/1999 | Makl et al. |
| 6,004,752 | A | 12/1999 | Loewy et al. |
| 6,013,957 | A | 1/2000 | Puzo et al. |
| 6,016,095 | A | 1/2000 | Herbert |
| 6,018,448 | A | 1/2000 | Anthony |
| 6,021,564 | A | 2/2000 | Hanson |
| 6,023,406 | A | 2/2000 | Kinoshita et al. |
| 6,031,710 | A | 2/2000 | Wolf et al. |
| 6,034,576 | A | 3/2000 | Kuth |
| 6,034,864 | A | 3/2000 | Naito et al. |
| 6,037,846 | A | 3/2000 | Oberhammer |
| 6,038,121 | A | 3/2000 | Naito et al. |
| 6,042,685 | A | 3/2000 | Shinada et al. |
| 6,046,898 | A | 4/2000 | Seymour et al. |
| 6,052,038 | A | 4/2000 | Savicki |
| 6,061,227 | A | 5/2000 | Nogi |
| 6,064,286 | A | 5/2000 | Ziegner et al. |
| 6,072,687 | A | 6/2000 | Naito et al. |
| 6,075,211 | A | 6/2000 | Tohya et al. |
| 6,078,117 | A | 6/2000 | Perrin et al. |
| 6,078,229 | A | 6/2000 | Funada et al. |
| 6,088,235 | A | 7/2000 | Chiao et al. |
| 6,091,310 | A | 7/2000 | Utsumi et al. |
| 6,092,269 | A | 7/2000 | Yializis et al. |
| 6,094,112 | A | 7/2000 | Goldberger et al. |
| 6,094,339 | A | 7/2000 | Evans |
| 6,097,260 | A | 8/2000 | Whybrew et al. |
| 6,097,581 | A | 8/2000 | Anthony |
| 6,104,258 | A | 8/2000 | Novak |
| 6,104,599 | A | 8/2000 | Ahiko et al. |
| 6,108,448 | A | 8/2000 | Song et al. |
| 6,111,479 | A | 8/2000 | Myohga et al. |
| 6,120,326 | A | 9/2000 | Brooks |
| 6,121,761 | A | 9/2000 | Herbert |
| 6,125,044 | A | 9/2000 | Cherniski et al. |
| 6,130,585 | A | 10/2000 | Whybrew et al. |
| 6,137,392 | A | 10/2000 | Herbert |
| 6,142,831 | A | 11/2000 | Ashman et al. |
| 6,144,547 | A | 11/2000 | Retseptor |
| 6,147,587 | A | 11/2000 | Hadano et al. |
| 6,150,895 | A | 11/2000 | Steigerwald et al. |
| 6,157,528 | A | 12/2000 | Anthony |
| 6,157,547 | A | 12/2000 | Brown et al. |
| 6,160,705 | A | 12/2000 | Stearns et al. |
| 6,163,454 | A | 12/2000 | Strickler |
| 6,163,456 | A | 12/2000 | Suzuki et al. |
| 6,165,814 | A | 12/2000 | Wark et al. |
| 6,175,287 | B1 | 1/2001 | Lampen et al. |
| 6,180,588 | B1 | 1/2001 | Walters |
| 6,181,231 | B1 | 1/2001 | Bartilson |
| 6,183,685 | B1 | 2/2001 | Cowman et al. |
| 6,185,091 | B1 | 2/2001 | Tanahashi et al. |
| 6,188,565 | B1 | 2/2001 | Naito et al. |
| 6,191,475 | B1 | 2/2001 | Skinner et al. |
| 6,191,669 | B1 | 2/2001 | Shigemura |
| 6,191,932 | B1 | 2/2001 | Kuroda et al. |
| 6,195,269 | B1 | 2/2001 | Hino |
| 6,198,123 | B1 | 3/2001 | Linder et al. |
| 6,198,362 | B1 | 3/2001 | Harada et al. |
| 6,204,448 | B1 | 3/2001 | Garland et al. |
| 6,205,014 | B1 | 3/2001 | Inomata et al. |
| 6,207,081 | B1 | 3/2001 | Sasaki et al. |
| 6,208,063 | B1 | 3/2001 | Horikawa et al. |
| 6,208,225 | B1 | 3/2001 | Miller |
| 6,208,226 | B1 | 3/2001 | Chen et al. |
| 6,208,494 | B1 | 3/2001 | Nakura et al. |
| 6,208,495 | B1 | 3/2001 | Wieloch et al. |
| 6,208,501 | B1 | 3/2001 | Ingalls et al. |
| 6,208,502 | B1 | 3/2001 | Hudis et al. |
| 6,208,503 | B1 | 3/2001 | Shimada et al. |
| 6,208,521 | B1 | 3/2001 | Nakatsuka |
| 6,208,525 | B1 | 3/2001 | Imasu et al. |
| 6,211,754 | B1 | 4/2001 | Nishida et al. |
| 6,212,078 | B1 | 4/2001 | Hunt et al. |
| 6,215,647 | B1 | 4/2001 | Naito et al. |
| 6,215,649 | B1 | 4/2001 | Appelt et al. |
| 6,218,631 | B1 | 4/2001 | Hetzel et al. |

| | | | |
|---|---|---|---|
| 6,219,240 | B1 | 4/2001 | Sasov |
| 6,222,427 | B1 | 4/2001 | Kato et al. |
| 6,222,431 | B1 | 4/2001 | Ishizaki et al. |
| 6,225,876 | B1 | 5/2001 | Akino et al. |
| 6,226,169 | B1 | 5/2001 | Naito et al. |
| 6,226,182 | B1 | 5/2001 | Maehara |
| 6,229,226 | B1 | 5/2001 | Kramer et al. |
| 6,236,572 | B1 | 5/2001 | Teshome et al. |
| 6,240,621 | B1 | 6/2001 | Nellissen et al. |
| 6,243,253 | B1 | 6/2001 | DuPre et al. |
| 6,249,047 | B1 | 6/2001 | Corisis |
| 6,249,439 | B1 | 6/2001 | DeMore et al. |
| 6,252,161 | B1 | 6/2001 | Hailey et al. |
| 6,262,895 | B1 | 7/2001 | Forthun |
| 6,266,228 | B1 | 7/2001 | Naito et al. |
| 6,266,229 | B1 | 7/2001 | Naito et al. |
| 6,272,003 | B1 | 8/2001 | Schaper |
| 6,281,704 | B2 | 8/2001 | Ngai et al. |
| 6,282,074 | B1 | 8/2001 | Anthony |
| 6,282,079 | B1 | 8/2001 | Nagakari et al. |
| 6,285,109 | B1 | 9/2001 | Katagiri et al. |
| 6,285,542 | B1 | 9/2001 | Kennedy, III et al. |
| 6,292,350 | B1 | 9/2001 | Naito et al. |
| 6,292,351 | B1 | 9/2001 | Ahiko et al. |
| 6,309,245 | B1 | 10/2001 | Sweeney |
| 6,310,286 | B1 | 10/2001 | Troxel et al. |
| 6,313,584 | B1 | 11/2001 | Johnson et al. |
| 6,320,547 | B1 | 11/2001 | Fathy et al. |
| 6,324,047 | B1 | 11/2001 | Hayworth |
| 6,324,048 | B1 | 11/2001 | Liu |
| 6,325,672 | B1 | 12/2001 | Belopolsky et al. |
| 6,327,134 | B1 | 12/2001 | Kuroda et al. |
| 6,327,137 | B1 | 12/2001 | Yamomoto et al. |
| 6,331,926 | B1 | 12/2001 | Anthony |
| 6,331,930 | B1 | 12/2001 | Kuroda et al. |
| 6,342,681 | B1 | 1/2002 | Goldberger et al. |
| 6,373,673 | B1 | 4/2002 | Anthony |
| 6,388,856 | B1 | 5/2002 | Anthony |
| 6,395,996 | B1 | 5/2002 | Tsai et al. |
| 6,448,873 | B1 | 9/2002 | Mostov |
| 6,456,481 | B1 | 9/2002 | Stevenson |
| 6,469,595 | B2 | 10/2002 | Anthony et al. |
| 6,498,710 | B1 | 12/2002 | Anthony |
| 6,504,451 | B1 | 1/2003 | Yamaguchi |
| 6,509,807 | B1 | 1/2003 | Anthony et al. |
| 6,510,038 | B1 | 1/2003 | Satou et al. |
| 6,522,516 | B2 | 2/2003 | Anthony |
| 6,549,389 | B2 | 4/2003 | Anthony et al. |
| 6,563,688 | B2 | 5/2003 | Anthony et al. |
| 6,580,595 | B2 | 6/2003 | Anthony et al. |
| 6,594,128 | B2 | 7/2003 | Anthony |
| 6,603,372 | B1 | 8/2003 | Ishizaki et al. |
| 6,603,646 | B2 | 8/2003 | Anthony et al. |
| 6,606,011 | B2 | 8/2003 | Anthony et al. |
| 6,606,237 | B1 | 8/2003 | Naito et al. |
| 6,618,268 | B2 | 9/2003 | Dibene, II et al. |
| 6,636,406 | B1 | 10/2003 | Anthony |
| 6,650,525 | B2 | 11/2003 | Anthony |
| 6,687,108 | B1 | 2/2004 | Anthony et al. |
| 6,696,952 | B2 | 2/2004 | Zirbes |
| 6,717,301 | B2 | 4/2004 | De Daran et al. |
| 6,738,249 | B1 | 5/2004 | Anthony et al. |
| 6,806,806 | B2 | 10/2004 | Anthony |
| 6,873,513 | B2 | 3/2005 | Anthony |
| 6,894,884 | B2 | 5/2005 | Anthony, Jr. et al. |
| 6,950,293 | B2 | 9/2005 | Anthony |
| 6,954,346 | B2 | 10/2005 | Anthony |
| 6,995,983 | B1 | 2/2006 | Anthony et al. |
| 7,042,303 | B2 | 5/2006 | Anthony et al. |
| 7,042,703 | B2 | 5/2006 | Anthony et al. |
| 7,050,284 | B2 | 5/2006 | Anthony |
| 7,106,570 | B2 | 9/2006 | Anthony, Jr. et al. |
| 7,110,227 | B2 | 9/2006 | Anthony et al. |
| 7,110,235 | B2 | 9/2006 | Anthony, Jr. et al. |
| 7,113,383 | B2 * | 9/2006 | Anthony et al. ............ 361/118 |
| 7,141,899 | B2 | 11/2006 | Anthony et al. |
| 7,180,718 | B2 | 2/2007 | Anthony et al. |
| 7,193,831 | B2 | 3/2007 | Anthony |
| 7,224,564 | B2 | 5/2007 | Anthony |
| 7,262,949 | B2 | 8/2007 | Anthony |
| 7,274,549 | B2 | 9/2007 | Anthony |
| 2001/0001989 | A1 | 5/2001 | Smith |
| 2001/0002105 | A1 | 5/2001 | Brandelik et al. |
| 2001/0002624 | A1 | 6/2001 | Khandros et al. |
| 2001/0008288 | A1 | 7/2001 | Kimura et al. |
| 2001/0008302 | A1 | 7/2001 | Murakami et al. |
| 2001/0008478 | A1 | 7/2001 | McIntosh et al. |
| 2001/0008509 | A1 | 7/2001 | Watanabe |
| 2001/0009496 | A1 | 7/2001 | Kappel et al. |
| 2001/0010444 | A1 | 8/2001 | Pahl et al. |
| 2001/0011763 | A1 | 8/2001 | Ushijima et al. |
| 2001/0011934 | A1 | 8/2001 | Yamamoto |
| 2001/0011937 | A1 | 8/2001 | Satoh et al. |
| 2001/0013626 | A1 | 8/2001 | Fujii |
| 2001/0015643 | A1 | 8/2001 | Goldfine et al. |
| 2001/0015683 | A1 | 8/2001 | Mikami et al. |
| 2001/0017576 | A1 | 8/2001 | Kondo et al. |
| 2001/0017579 | A1 | 8/2001 | Kurata |
| 2001/0019869 | A1 | 9/2001 | Hsu |
| 2001/0020879 | A1 | 9/2001 | Takahashi et al. |
| 2001/0021097 | A1 | 9/2001 | Ohya et al. |
| 2001/0022547 | A1 | 9/2001 | Murata et al. |
| 2001/0023983 | A1 | 9/2001 | Kobayashi et al. |
| 2001/0024148 | A1 | 9/2001 | Gerstenberg et al. |
| 2001/0028581 | A1 | 10/2001 | Yanagisawa et al. |
| 2001/0029648 | A1 | 10/2001 | Ikada et al. |
| 2001/0031191 | A1 | 10/2001 | Korenaga |
| 2001/0033664 | A1 | 10/2001 | Poux et al. |
| 2001/0035801 | A1 | 11/2001 | Gilbert |
| 2001/0035802 | A1 | 11/2001 | Kadota |
| 2001/0035805 | A1 | 11/2001 | Suzuki et al. |
| 2001/0037680 | A1 | 11/2001 | Buck et al. |
| 2001/0039834 | A1 | 11/2001 | Hsu |
| 2001/0040484 | A1 | 11/2001 | Kim |
| 2001/0040487 | A1 | 11/2001 | Ikata et al. |
| 2001/0040488 | A1 | 11/2001 | Gould et al. |
| 2001/0041305 | A1 | 11/2001 | Sawada et al. |
| 2001/0043100 | A1 | 11/2001 | Tomita et al. |
| 2001/0043129 | A1 | 11/2001 | Hidaka et al. |
| 2001/0043450 | A1 | 11/2001 | Seale et al. |
| 2001/0043453 | A1 | 11/2001 | Narwankar et al. |
| 2001/0045810 | A1 | 11/2001 | Poon et al. |
| 2001/0048581 | A1 | 12/2001 | Anthony et al. |
| 2001/0048593 | A1 | 12/2001 | Yamauchi et al. |
| 2001/0048906 | A1 | 12/2001 | Lau et al. |
| 2001/0050550 | A1 | 12/2001 | Yoshida et al. |
| 2001/0050600 | A1 | 12/2001 | Anthony et al. |
| 2001/0050837 | A1 | 12/2001 | Stevenson et al. |
| 2001/0052833 | A1 | 12/2001 | Enokihara et al. |
| 2001/0054512 | A1 | 12/2001 | Belau et al. |
| 2001/0054734 | A1 | 12/2001 | Koh et al. |
| 2001/0054756 | A1 | 12/2001 | Horiuchi et al. |
| 2001/0054936 | A1 | 12/2001 | Okada et al. |
| 2002/0000521 | A1 | 1/2002 | Brown |
| 2002/0000583 | A1 | 1/2002 | Kitsukawa et al. |
| 2002/0000821 | A1 | 1/2002 | Haga et al. |
| 2002/0000893 | A1 | 1/2002 | Hidaka et al. |
| 2002/0000895 | A1 | 1/2002 | Takahashi et al. |
| 2002/0003454 | A1 | 1/2002 | Sweeney et al. |
| 2002/0005880 | A1 | 1/2002 | Ashe et al. |
| 2002/0024787 | A1 | 2/2002 | Anthony |
| 2002/0027263 | A1 | 3/2002 | Anthony et al. |
| 2002/0027760 | A1 | 3/2002 | Anthony |
| 2002/0044401 | A1 | 4/2002 | Anthony et al. |
| 2002/0075096 | A1 | 6/2002 | Anthony |
| 2002/0079116 | A1 | 6/2002 | Anthony |

| | | | |
|---|---|---|---|
| 2002/0089812 | A1 | 7/2002 | Anthony et al. |
| 2002/0113663 | A1 | 8/2002 | Anthony et al. |
| 2002/0122286 | A1 | 9/2002 | Anthony |
| 2002/0131231 | A1 | 9/2002 | Anthony |
| 2002/0149900 | A1 | 10/2002 | Anthony |
| 2002/0158515 | A1 | 10/2002 | Anthony, Jr. et al. |
| 2002/0186100 | A1 | 12/2002 | Anthony et al. |
| 2003/0029632 | A1 | 2/2003 | Anthony, Jr. et al. |
| 2003/0029635 | A1 | 2/2003 | Anthony, Jr. et al. |
| 2003/0048029 | A1 | 3/2003 | DeDaran et al. |
| 2003/0067730 | A1 | 4/2003 | Anthony et al. |
| 2003/0161085 | A1 | 8/2003 | Anthony |
| 2003/0202312 | A1 | 10/2003 | Anthony et al. |
| 2003/0206388 | A9 | 11/2003 | Anthony et al. |
| 2003/0210125 | A1 | 11/2003 | Anthony |
| 2003/0231451 | A1 | 12/2003 | Anthony |
| 2003/0231456 | A1 | 12/2003 | Anthony et al. |
| 2004/0004802 | A1 | 1/2004 | Anthony et al. |
| 2004/0008466 | A1 | 1/2004 | Anthony et al. |
| 2004/0027771 | A1 | 2/2004 | Anthony |
| 2004/0032304 | A1 | 2/2004 | Anthony et al. |
| 2004/0054426 | A1 | 3/2004 | Anthony |
| 2004/0085699 | A1 | 5/2004 | Anthony |
| 2004/0105205 | A1 | 6/2004 | Anthony et al. |
| 2004/0124949 | A1 | 7/2004 | Anthony et al. |
| 2004/0130840 | A1 | 7/2004 | Anthony |
| 2004/0218332 | A1 | 11/2004 | Anthony et al. |
| 2004/0226733 | A1 | 11/2004 | Anthony et al. |
| 2005/0016761 | A9 | 1/2005 | Anthony, Jr. et al. |
| 2005/0018374 | A1 | 1/2005 | Anthony |
| 2005/0063127 | A1 | 3/2005 | Anthony |
| 2005/0248900 | A1 | 11/2005 | Anthony |
| 2005/0286198 | A1 | 12/2005 | Anthony et al. |
| 2006/0023385 | A9 | 2/2006 | Anthony et al. |
| 2006/0139836 | A1 | 6/2006 | Anthony |
| 2006/0139837 | A1 | 6/2006 | Anthony et al. |
| 2006/0193051 | A1 | 8/2006 | Anthony et al. |
| 2006/0203414 | A1 | 9/2006 | Anthony |
| 2007/0019352 | A1 | 1/2007 | Anthony |
| 2007/0047177 | A1 | 3/2007 | Anthony |
| 2007/0057359 | A1 | 3/2007 | Anthony et al. |
| 2007/0103839 | A1 | 5/2007 | Anthony et al. |
| 2007/0109709 | A1 | 5/2007 | Anthony et al. |

FOREIGN PATENT DOCUMENTS

| | | |
|---|---|---|
| DE | 198 57 043 C1 | 3/2000 |
| EP | 0623363 | 11/1994 |
| EP | 98915364 | 11/1994 |
| EP | 8172025 | 7/1996 |
| EP | JP8172025 | 7/1996 |
| EP | 0776016 | 5/1997 |
| EP | 0933871 | 8/1999 |
| EP | 1022751 | 7/2000 |
| EP | 1024507 | 8/2000 |
| EP | 1061535 | 12/2000 |
| FR | 2765417 | 12/1998 |
| FR | 2808135 | 10/2001 |
| GB | 2217136 | 4/1988 |
| GB | 2341980 | 3/2000 |
| JP | 63-269509 | 11/1988 |
| JP | 1-27251 | 1/1989 |
| JP | 01-120805 | 5/1989 |
| JP | 01-212415 | 8/1989 |
| JP | 02-267879 | 11/1990 |
| JP | 03-018112 | 1/1991 |
| JP | 03-71614 | 3/1991 |
| JP | 5-283284 | 10/1993 |
| JP | 05-299292 | 11/1993 |
| JP | 06-053048 | 2/1994 |
| JP | 06-053049 | 2/1994 |
| JP | 06-053075 | 2/1994 |
| JP | 06-053077 | 2/1994 |
| JP | 06-053078 | 2/1994 |
| JP | 06-084695 | 3/1994 |
| JP | 06-151014 | 5/1994 |
| JP | 06-151244 | 5/1994 |
| JP | 06-151245 | 5/1994 |
| JP | 06-325977 | 11/1994 |
| JP | 07-235406 | 9/1995 |
| JP | 07-235852 | 9/1995 |
| JP | 07-240651 | 9/1995 |
| JP | 08-124795 | 5/1996 |
| JP | 08-163122 | 6/1996 |
| JP | 08-172025 | 7/1996 |
| JP | 09-232185 | 9/1997 |
| JP | 09-284077 | 10/1997 |
| JP | 09-284078 | 10/1997 |
| JP | 9-294041 | 11/1997 |
| JP | 11-21456 | 8/1999 |
| JP | 11-214256 | 8/1999 |
| JP | 11-223396 | 8/1999 |
| JP | 11-294908 | 10/1999 |
| JP | 11-305302 | 11/1999 |
| JP | 11-319222 | 11/1999 |
| JP | 11-345273 | 12/1999 |
| WO | WO 91/15046 | 10/1991 |
| WO | WO 97/43786 | 11/1997 |
| WO | WO 98/45921 | 10/1998 |
| WO | WO 99/04457 | 1/1999 |
| WO | WO 99/19982 | 4/1999 |
| WO | WO 99/37008 | 7/1999 |
| WO | WO 99/52210 | 10/1999 |
| WO | WO 00/16446 | 3/2000 |
| WO | WO 00/65740 | 11/2000 |
| WO | WO 00/74197 | 12/2000 |
| WO | WO 00/77907 | 12/2000 |
| WO | 01/06631 | 1/2001 |
| WO | WO 01/10000 | 2/2001 |
| WO | WO 01/41232 | 6/2001 |
| WO | WO 01/41233 | 6/2001 |
| WO | WO 01/45119 | 6/2001 |
| WO | WO 01/71908 | 9/2001 |
| WO | WO 01/75916 | 10/2001 |
| WO | WO 01/84581 | 11/2001 |
| WO | WO 01/86774 | 11/2001 |
| WO | WO 02/59401 | 1/2002 |
| WO | WO 02/11160 | 2/2002 |
| WO | WO 02/15360 | 2/2002 |
| WO | WO 02/27794 | 4/2002 |
| WO | WO 02/33798 | 4/2002 |
| WO | WO 02/45233 | 6/2002 |
| WO | WO 02/065606 | 8/2002 |
| WO | WO 02/080330 | 10/2002 |
| WO | WO 03/005541 | 1/2003 |
| WO | WO 2004/070905 | 8/2004 |
| WO | WO 2005/002018 | 1/2005 |
| WO | WO 2005/015719 | 2/2005 |
| WO | WO 2005/065097 | 7/2005 |
| WO | WO 2007/103965 | 9/2007 |

OTHER PUBLICATIONS

PCT International Search Report for PCT/US01/44681.

Grab, "An Intuitive Approach to EM Fields," EMC Test & Design, Jan. 1991, pp. 30-33.

Grab, "An Intuitive Approact to EM Coupling," EMC Test & Design, Dec. 1993, pp. 20-25.

Sakamoto, "Noiseproof Power Supplies: What's Important in EMI Removal Filters?" JEE, Jun. 1986, pp. 80-85.

Montrose, "Analysis on Loop Area Trace Radiated Emissions from Decoupling Capacitor Placement on Printed Circuit Boards," IEEE, 1999, pp. 423-428.

Miyoshi, "Surface Mounted Distributed Constant Type Noise Filter," IEEE, 1999, pp. 157-160.

Shigeta et al., "Improved EMI Performance by Use of a Three-Terminal-Capacitor Applied to an IC Power Line," IEEE, 1999, pp. 161-164.
PCT International Search Report for PCT/US99/07653.
IPER for PCT/US99/07653.
U.S. Appl. No. 10/479,506, Claims 1-46 from Preliminary Amendment filed Dec. 10, 2003.
U.S. Appl. No. 10/189,339, Claims 1-41 from Preliminary Amendment filed Oct. 28, 2003.
U.S. Appl. No. 10/443,792, Claims 1-41 from Preliminary Amendment filed Oct. 28, 2003.
PCT International Search Report for PCT/US98/06962.
PCT International Search Report for PCT/US99/01040.
PCT International Search Report for PCT/US00/11409.
PCT International Search Report for PCT/US00/14626.
PCT International Search Report for PCT/US00/16518.
PCT International Search Report for PCT/US00/21178.
Fang et al., "Conductive Polymers Prolong Circuit Life," Design News, 3 pages.
Carpenter, Jr. et al., "A New Approach to TVSS Design," Power Quality Assurance, Sep./Oct. 1996 p. 60-63.
Raychem, "Polyswitch Resettable Fuses," Circuit Protection Databook, Jan. 1996, pp. 11-18.
PCT International Search Report for PCT/US01/41720.
PCT International Search Report for PCT/US01/09185.
Polka et al., "Package-Level Interconnect Design for Optimum Electrical Performance," Intel Technology Journal Q3, 2000, pp. 1-17.
PCT International Search Report for PCT/US01/43418.
PCT International Search Report for PCT/US01/32480.
PCT International Search Report for PCT/US02/10302.
PCT International Search Report for PCT/US02/21238.
PCT International Search Report for PCT/US01/13911.
PCT International Search Report for PCT/US91/02150.
PCT International Search Report for PCT/US01/03792.
"Johanson Dielectrics, Inc. Licenses X2Y Circuit Conditioning Technology," Press Release, Dec. 16, 1998, 1 page.
Beyne et al., "PSGA—an innovative IC package for single and multichip designs," Components, Mar. 1997, pp. 6-9.
"EMC Design for Brush Commutated DC Electric Motors," Sep. 15, 1997, pp. 1-2.
"Tomorrow's Capacitors," Components, 1996, No. 4, p. 3.
Mason, "Valor—Understanding Common Mode Noise," Mar. 30, 1998, pp. 1-7.
Pending specification, claims, figures for U.S. Appl. No. 10/237,079, Claims 21-81; filed Sep. 9, 2002.
Pending specification, claims, figures for U.S. Appl. No. 10/766,000, Claims 1-63; filed Jan. 29, 2004.
Pending specification, claims, figures for U.S. Appl. No. 10/399,630, Claims 1-35; filed Aug. 27, 2003.
Pending specification, claims, figures for U.S. Appl. No. 10/432,840, Claims 1-39; filed May 28, 2003.
Pending specification, claims, figures for U.S. Appl. No. 10/443,482, Claims 1-25; filed Jun. 12, 2003.
Pending specification, claims, figures for U.S. Appl. No. 10/435.199, Claims 1-32; filed May 12, 2003.
Pending specification, claims, figures for U.S. Appl. No. 10/115,159, Claims 1-31; filed Apr. 2, 2002.
Pending specification, claims, figures for U.S. Appl. No. 10/189,338, Claims 1-69; filed Jul. 2, 2002.
Pending specification, claims, figures for U.S. Appl. No. 10/189,339, Claims 1-41; filed Jul 2, 2002.
Pending specification, claims, figures for U.S. Appl. No. 10/479,506, Claims 1-46; filed Dec. 10, 2003.
Pending specification, claims, figures for U.S. Appl. No. 10/443,764, Claims 26-40; filed Sep. 16, 2003.
Pending specification, claims, figures for U.S. Appl. No. 10/443,792, Claims 1-41; May 23, 2003.
Pending specification, claims, figures for U.S. Appl. No. 10/443,788, Claims 1; 21-45; filed May 23, 2003.
Pending specification, claims, figures for U.S. Appl. No. 10/443.778, Claims 1; 21-59; filed May 23, 2003.
Pending specification, claims, figures for U.S. Appl. No. 10/460,361, Claims 1-16; filed Jun. 13, 2003.
Pending specification, claims, figures for U.S. Appl. No. 10/705,962, Claims 19-33; filed May 25, 2005.
Pending specification, claims, figures for U.S. Appl. No. 10/369,335, Claims 1-20; Feb. 18, 2003.
Pending specification, claims, figures for U.S. Appl. No. 09/647,648, Claims 1-48; filed Nov. 17, 2000.
Pending specification, claims, figures for U.S. Appl. No. 10/328,942, Claims 1-20; filed Dec. 23, 2002.
Pending specification, claims, figures for U.S. Appl. No. 09/632,048, Claims 1-20; filed Aug. 3, 2000.
Pending specification, claims, figures for U.S. Appl. No. 09/996,355, Claims 1-73; filed Nov. 29, 2001.
Pending specification, claims, figures for U.S. Appl. No. 10/023,467, Claims 1-20; filed Dec. 17, 2001.
Weir, et al., "DesignCon 2005, High Performance FPGA Bypass Networks".
Pending claims 1-40 and figures (3 pages) for Application No. 10/399,590; the specification is contained in WO 02/33798, filed Oct. 17, 2001, which is the published version of PCT/US01/32480, which is Neifeld Reference: X2YA0015UPCT-US, which is reference F-063 in the Information Disclosure Statement filed Apr. 23, 2004.
PCT International Search Report for PCT/US04/00218.
PCT International Search Report for PCT/US04/14539.
Australian Patent Office Examination Report for SG 200303041-8; Neifeld Ref: X2YA0025UPCT-SG.
PCT International Search Report for PCT/US04/18938.
Muccioli, "EMC Society Seattle and Oregon Chapters—New X2Y Filter Technology Emerges as Singles Component Solution for Noise Suppression".
PCT Corrected IPER for PCT/US04/00218.
Supplementary Partial European Search Report EP 99916477.
Supplementary European Search Report EP 98915364.
PCT USR for PCT/US04/39777.
EP Examination Report for 99916477.5-2215.
Australian Examiner's First Report on Patent Application No. 2002320289; mailed Dec. 4, 2006.
Letter from Australian examiner dated Jan. 23, 2007 explaining error in citation contained in Item O-096 from this reference citation; the correct reference is cited in this reference citation list: F-039.
PCT International Search Report PCT/US06/06609.
PCT Written Opinion of the International Search Authority PCT/US06/06609.

* cited by examiner

CONNECTOR RELATED STRUCTURES INCLUDING AN ENERGY CONDITIONER

CROSS-REFERENCE TO RELATED APPLICATIONS

This application claims priority to U.S. provisional applications 60/473,914, filed May 29, 2003; 60/500,347, filed Sep. 5, 2003; 60/502,617, filed Sep. 15, 2003; and 60/505,874 filed Sep. 26, 2003; 60/523,098 filed Nov. 19, 2003; and 60/534,984, filed Jan. 9, 2004.

FIELD OF THE INVENTION

This invention relates to energy conditioning.

SUMMARY OF THE INVENTION

Objects of this invention are to provide energy conditioning, energy conditioning structures, and connectors and devices that incorporate energy conditioners.

The invention provides electrical energy conditioners particularly useful for power applications. Internal structure of the energy conditioners may be included as components of connectors or electrical devices. Electrical devices are devices that include an electrical load.

In all embodiments, internal structure of the conditioner includes a common conductor (G conductor), and some of the common conductor (G conductor) exists between surfaces of portions of two other conductors (A and B conductors), providing an overlapped structure. In all embodiments, the G conductor is electrically insulated from the A and B conductors both when the conditioner is connected in a circuit and when the conditioner is not connected in a circuit. In all embodiments, the A and B conductors are electrically isolated from one another when the conditioner is not connected in a circuit. In all embodiments, the A, B, and G conductors are spatially separated from one another in the overlapped region so that there is no conductive connection between any of them in the overlapped region.

Preferably, the parts of the G, A and B conductors form a layered structural portion (or layered portion) and part of the G conductor forming part of the layered portion exists between the portions of the A and B conductors forming part of the layered portion. That is, the overlapped portion is formed by layered portions of the A, B, and G conductors.

In all embodiments, there are at least two G conductor tabs of the G conductor extending from the overlapped portion or layered portion of the A, B, and G conductors.

In preferred embodiments, the internal structure of the conditioner and either or both of a connector structure and an electrical load are substantially enclosed in a enclosing conductive structure. In these embodiments, the G conductor is coupled, either conductively or primarily substantially capacitively, to the enclosing conductive structure. For these structure, preferably there is at least one conductive path between two tabs of the G conductor that is outside of the overlapped structure. For these structure, preferably, there is a conductive path connecting two tabs of the G conductor that extends between conductive pathways connected to the A and B conductors. For these structure, preferably, there is a conductive path connecting the two tabs of the G conductor that extends between conductive pathways connected to the A and B conductors on one side of the overlapped region, and there is another conductive path between two tabs of the G conductor that extends between conductive pathways connected to the A and B conductors on the other side of the overlapped region. For these structure, preferably, there a conductive pathway connecting two tabs of the G conductor that extends around a conductive path connected to the A conductor, and a conductive pathway connecting to two tabs of the G conductor that extends around a conductive path connected to the B conductor. For these structure, preferably, there a conductive pathway connecting two tabs of the G conductor that extends around a conductive path connected to the A conductor on one side of the overlapped structure, and a conductive pathway connecting to two tabs of the G conductor that extends around a conductive path connected to the B conductor on the same side of the overlapped structure, a conductive pathway connecting two tabs of the G conductor that extends around a conductive path connected to the A conductor on an opposite side of the overlapped structure, and a conductive pathway connecting to two tabs of the G conductor that extends around a conductive path connected to the B conductor on the opposite side of the overlapped structure.

As just noted, preferably, there exists a conductive path connecting the two tabs of the G conductor to one another which does not encircle any conductive path connected to either the A or B conductor. Preferably, this path connecting the two tabs of the G conductor to one another is very close to the outer surface of the overlapped or layered structure. Specifically, that path preferably projects not more than 10 millimeters, preferably not more than 5 millimeters, and preferably not more than about 1 millimeter from an outer major surface of conductive layers of the layered structure. Preferably, the cross sectional area defined by the cross section of the ground strap and the G conductor is less than 30 square millimeters, preferably less than 20 square millimeters, preferably less than 10 square millimeters, and more preferably less than 5 square millimeters.

Preferably, the ground strap is also wide and flat. Preferably, the ground strap is at least 0.5, at least 1.0, at least 2, or at least 5 millimeters wide (as defined by the direction parallel to major surfaces of the overlapped or layered structure and perpendicular to the direction between the G conductor tabs). Preferably, the ground strap is at least 5, at least 10, at least 20, at least 50, or at least 80 percent as wide as the overlapped or layered structure (as defined by the direction parallel to major surfaces of the overlapped or layered structure and perpendicular to the direction between the G conductor tabs, or a direction of a line segment connecting an a tab of an A conductor to a tab of a B conductor).

Many embodiments include additional geometric relationships between portions of the A, B, and G conductors, such as shape and extent of layer overlap of layered portions of the A, B, and G conductors, width of portions of the conductive structures that extend beyond the overlap region, and shapes of the overlapped regions of the three conductive structures. The portions of the conductive structures that extend beyond the overlap region are generally referred to herein as tabs or tab regions. The tabs or tab regions project out of dielectric enclosing other surface of the overlapped region or layered structure of the A, B, and G conductors.

Preferably, either the G conductor or structure designed to connect to the G conductor, is designed to connect to a ground line.

Preferably, the A, B, and G conductors are designed so that the A and B conductors can be electrically connected to lines from a source of electric power. Alternatively, the A, B, G structures are designed so that the A and B conductors can each be electrically connected to data or control lines.

Various embodiments include various one of the following important features.

Preferably, tabs of the G conductor extend in a different direction or different directions than the direction in which tabs of the A and B conductors extend. Preferably, a G tab direction is different from each of an A tab direction and a B tab direction by at least forty five degrees.

Preferably, no two tabs of the A, B, and G conductors are vertically aligned with one another, that is, aligned along a direction perpendicular to the layered region formed by overlap of the A, B, and G conductors.

Preferably, the portions of the A, B, and G conductor tabs that are not coated or potted with dielectric are sufficiently spaced apart to prevent dielectric breakdown, or flash-over, in air. Thus, at 120 volts and 60 cycles, portions of the A or B tabs not coated or covered by dielectric are preferably spaced from portions of other tabs not coated with dielectric by at least 1, 2, 3, 5, or 7 millimeters. The nominal European voltage standard is now 230 volts and 50 Hz, for which uncoated portions of the A or B tabs should be spaced from one another at least 1, 2, 3, 5, 7 or 10 millimeters.

Preferably, the tabs of the A, B, and G conductors are not circular in cross section. Instead they are relatively wide and flat. For example, each tab may have a width to height of cross section of greater than 2, 4, 6, 8, 10, 20, or 30. Here, height refers to the direction passing through the overlapped regions of the A, B, and G electrodes, which in layered structural embodiments, is the distance from the bottom surface to the top surface in the embodiments having a layered structure.

Preferably, at least one G tab projects out of the layered structure in a direction perpendicular to the direction at which a tab of the A or B conductor projects out of the layered structure.

Preferably, all tabs of the A, B, and G conductors project out of the layered structure in different directions.

Preferably, dielectric covers the top and bottom conductive surfaces of the layered structure. Preferably, the overlapped or layered structure is "potted". That is, it is entirely coated with dielectric material, except for parts of the tab portions.

Preferably, the initial portions of the tab portions where they project out of the overlapped region or layered structure are also coated with dielectric, or potted. Preferably, this dielectric coating covers each tab portion for a distance beyond the overlapped or layered structure of at least 0.01 millimeter, at least 0.1 millimeter, at least 1 millimeter, at least 2 millimeters, or at least 5 millimeters. As the normal intended voltage of an application increases, the distance along with the dielectric should cover the tab regions near the overlapped or layered structure increases. For implementations intended for 120 volt 60 cycle operation, this length should be at least 1 millimeter, and more preferably at least 2 millimeters. For implementations intended for 230 volts and 50 Hz, this length should be at least 1 millimeter, and more preferably at least 2 millimeters, and more preferably at least 3 mm. For digital signal and control line implementations for under 25 volts, preferably, this dielectric coating covers each tab portion for a distance beyond the overlapped region of at least 0.01 millimeter, at least 0.1 millimeter. Typical potting materials have a volume resistivity of greater than about ten to the tenth power ohm centimeters at room temperature.

Preferably, the ratio of length a tab projects out of the layered structures to the height of the layered structure is greater than a certain ratio. Preferably, one or more of the tabs of the A, B, and G conductors project out from side of the layered structure at least 1, 2, 5, 10, or 20 times the height of the conductive layer of the same conductor.

Preferably, the ratio of length a tab projects out of the layered structures to the height of the layered structure is greater than a certain ratio. Preferably, one or more of the tabs of the A, B, and G conductors project out from side of the layered structure by at least one tenth, one eighth, one fourth, one half, 1, 2, 4, 5, 6 or 10 times the height of the layered structure. The height of the layered in this context means the distance between the outside surfaces of the A and B conductors.

At least two of the tabs of the A, B, and G conductors project out of the layered structure at different heights from one another. Preferably, the A, B, and G electrodes all project out of the layered structure at different heights from one another.

The existence of dielectric covering or coating the side surfaces of the overlapped region or layered structure is important. Preferably, the only side surfaces of the A, B, and G conductors that are not enclosed in dielectric are those surfaces forming the tabs that project out of the layered structure. Preferably, the top and bottom surfaces of the overlapped or layered structure are covered or coated with dielectric.

Various ones of the structural features of the layered structure and the tabs projecting out of the layered structure mentioned above help to prevent "flash over" when, for example, 60 cycles AC 120 volt or 50 AC 230 volts is applied across the A and B conductors. In this context, "flash over" means dielectric breakdown through air between various ones of the A, B, and G terminals, such that current flows for example from the A electrode, through air, to the B electrode. "Flash over" connotes the light flash often caused by plasma generation or sparking in air associated with this type of dielectric breakdown.

In preferred connector embodiments, the G conductor is conductively connected to a ground pin of the connector. In preferred device embodiments including a load, the G conductor is conductively connected to a ground pin of the connector.

In less preferred embodiments, the internal structure of the conditioner may reside on a back side of a connector, adjacent but outside of an enclosing conductive structure enclosing the male or female pins of the connector, and the G conductor is either substantially capacitively coupled or conductively connected to the conductive structure enclosing the male or female pins of the connector. Similarly, in less preferred embodiments, internal structure of the conditioner may reside on the outside of an enclosing conductive structure that encloses a load, and the internal structure of the conditioner may be substantially capacitively coupled or conductively connected to the enclosing conductive structure.

For bypass configurations, there exists at least one tab for each of the A and B conductors, and preferably only one tab for each of the A and B conductors. For feed through configurations, there exists at least two tabs for each one of the A and B conductors. For feed through configurations, preferably there exists exactly two tabs for each one of the A and B conductors. For bypass configuration, preferably, there exists exactly one A tab and only one B tab. For both configurations, preferably, there exists exactly two G conductor tabs.

Method of making electrical energy conditioners preferably includes assembly of component parts including planar dielectric elements preferably pre-coated with a conductive layer, conductive electrode elements, and a housing. These methods may include metallizing a surface of a dielectric wafer (such by wet or dry deposition of a metal layer) so that a metal component may subsequently be uniformly mechanically bonded to the metallization, and thereby structurally and uniformly bonded to the surface of the dielectric wafer. However, we also contemplate fabrication at least partially by layering processes in which the conductive layers and various tab structures and spatial layer overlap relationships disclosed herein are achieved by layering and patterning, as opposed to mechanical assembly.

Electrical devices of the invention include internal structure of the conditioner and a load substantially enclosed in a conductive enclosure. The G conductor may be either capacitively or conductively coupled to the conductive enclosure.

Preferably, the electrical conductivity of the portion of the G conductor in the overlapped region is relatively high. For example, the G conductor preferably is formed including a metal extending across the overlapped region that is formed substantially from an elemental metal, like copper, silver, gold, nickel, palladium, etc., to provide a very high conductivity (very low resistivity), less preferably substantially includes a section in the overlapped region spanned by an alloy (including solder), and less preferably includes a section in the overlapped region formed from a conductive paste.

BRIEF DESCRIPTIONS OF THE DRAWINGS

Where applicable, the same numeral refers in the figures to similar or the same component.

Figure 16A:
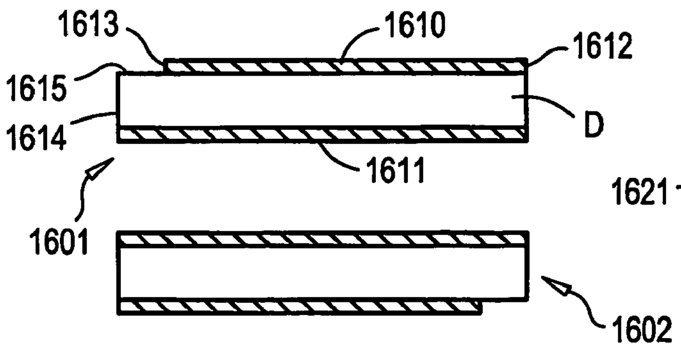
FIG. 16A shows in side section two component structures used in one method of making internal structures of a novel conditioner, in which lateral extension of metallization layers forming part of A, B, and G conductors differ from one another.
Figure 16B:
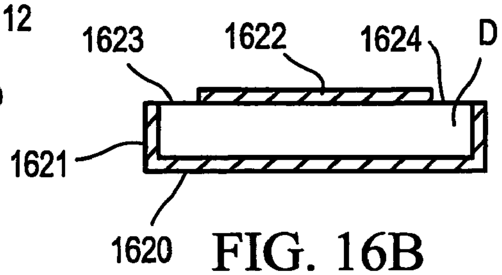
FIG. 16B is a side section view showing component structures of a novel conditioner in which metallization layers forming part of a G conductor structure extends to certain side surfaces.
Figure 16C:
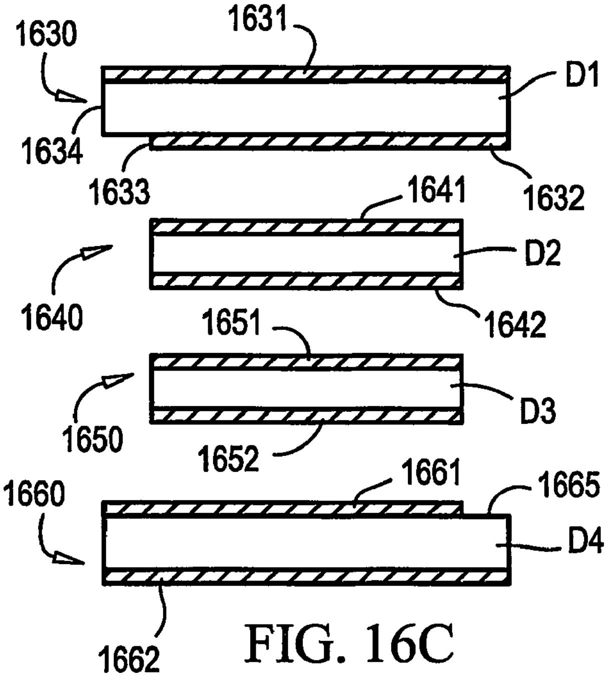
Figure 17:
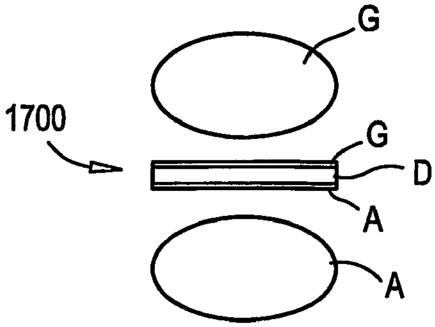
Figure 18:
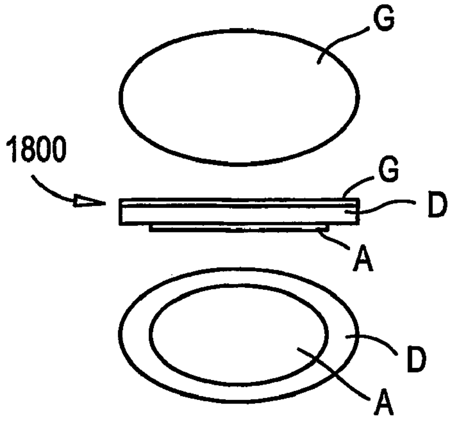
Figure 19:
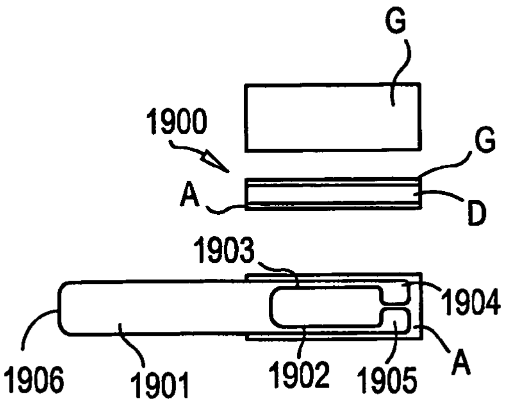
Figure 20:
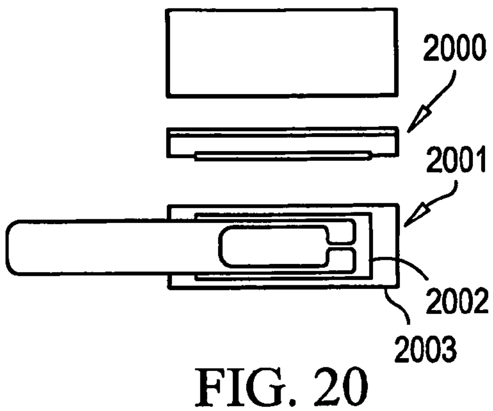
Figure 21:
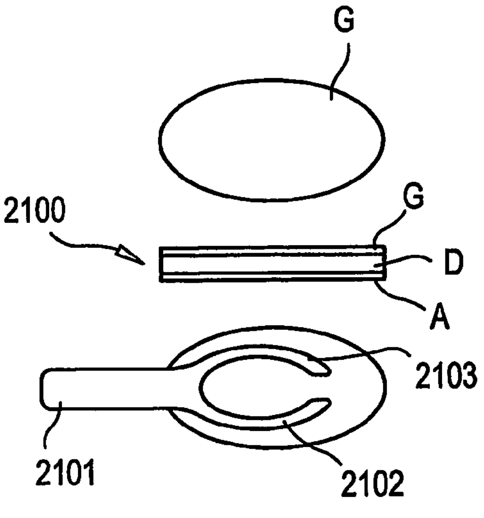
Figure 22:
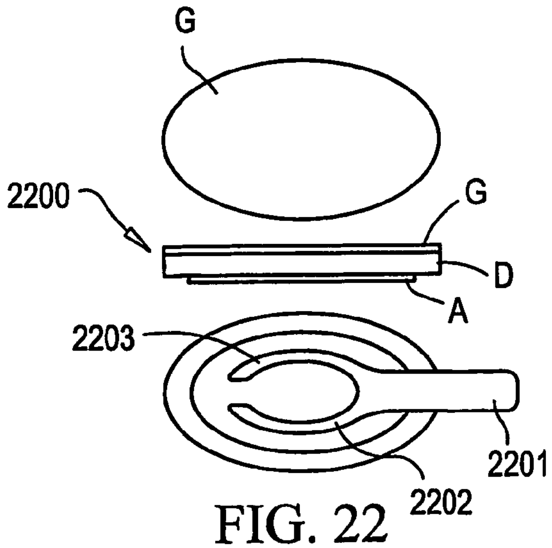
Figure 23:
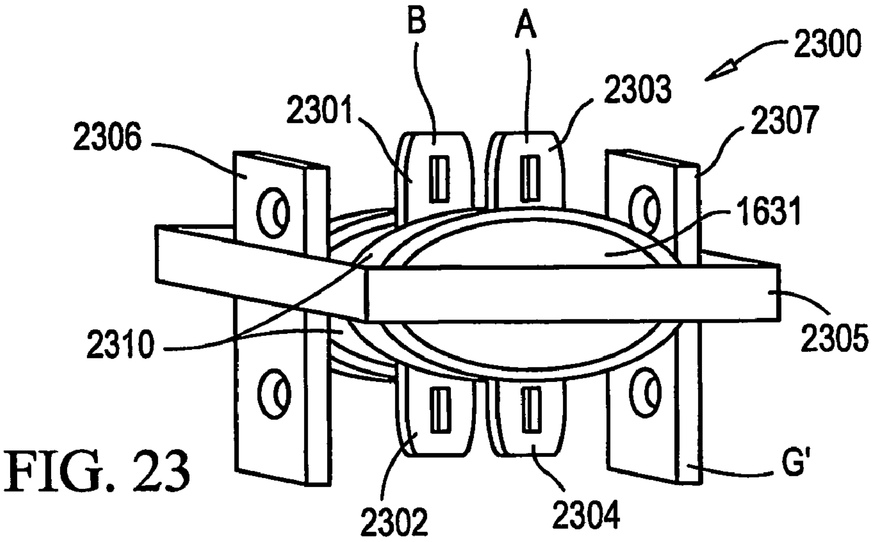
Figure 24:
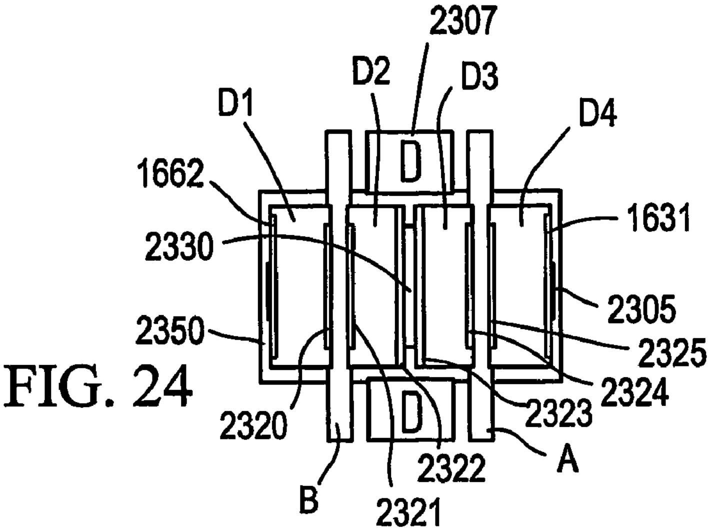
Figure 25:
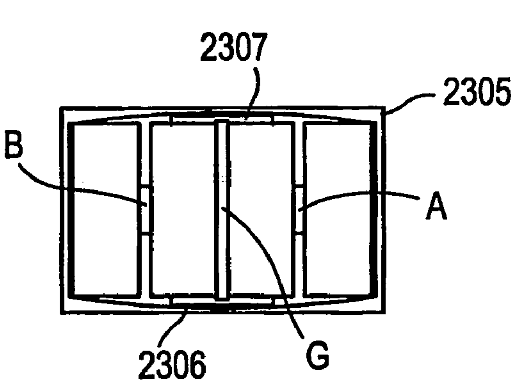
Figure 26:
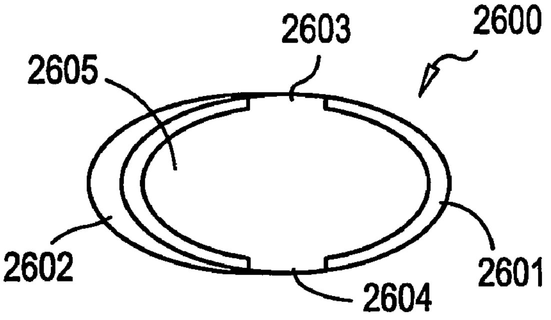
Figure 27:
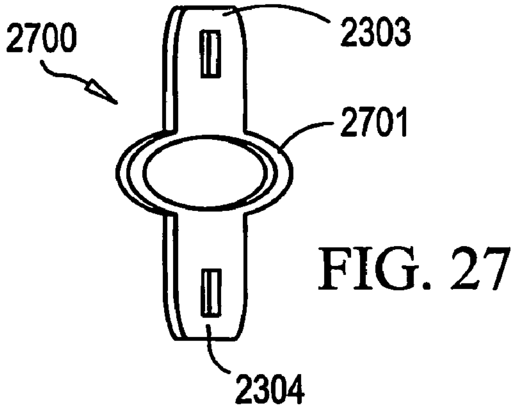
Figure 28:
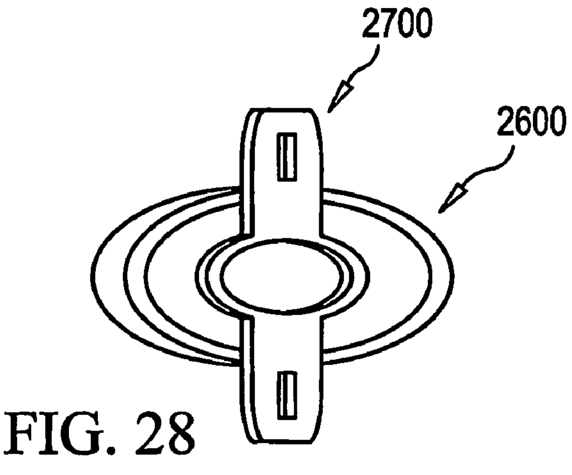
Figure 29:
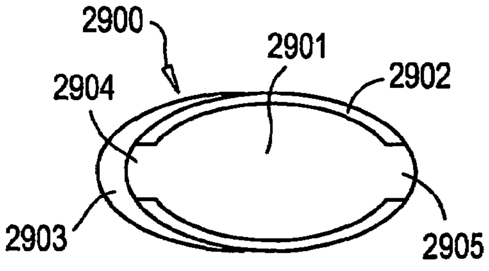
Figure 30:
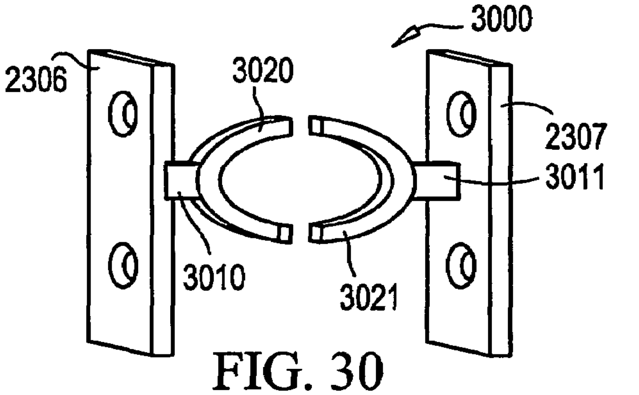
Figure 31:
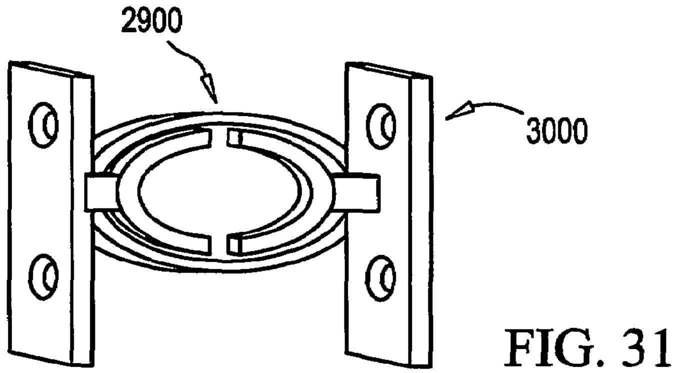
Figure 32:
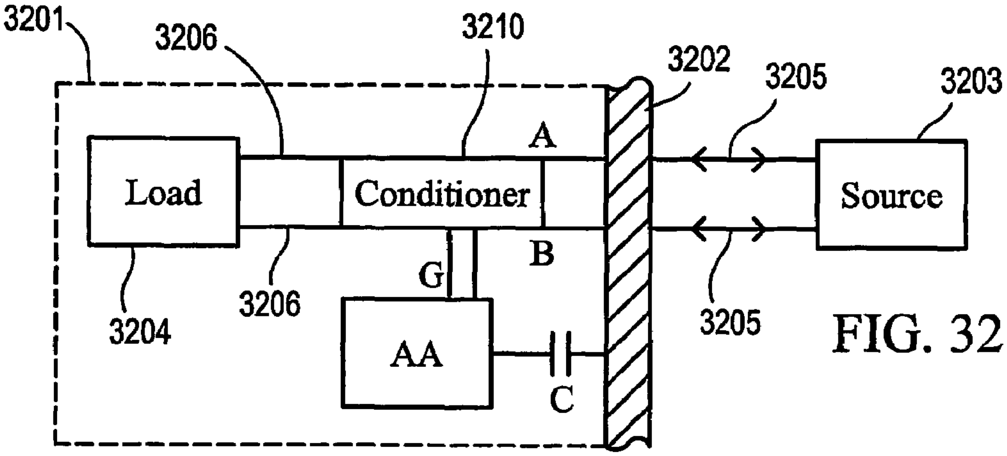
Figure 33:
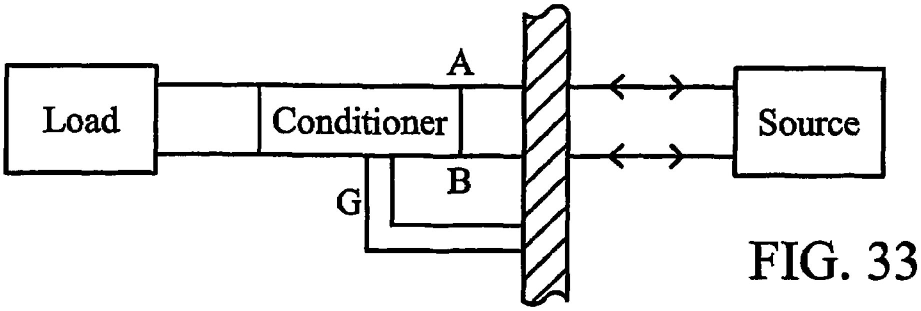

FIG. 16C an exploded assembly view in side section view of four component structures used in one method of making internal structures of a novel conditioner, in which lateral extension of metallization layer forming parts of the A, B, and G conductors differ from one another;

FIG. 17 is a composite plan and side section view showing another alternative geometric relationship of layers of internal structure of a novel conditioner in which certain layers have non-rectangular, elliptical, or circular shapes;

FIG. 18 is a composite of plan and side section views showing another alternative geometric relationship of layers of internal structure of a novel conditioner in which certain layers have non-rectangular shapes and varied lateral extensions;

FIG. 19 is a composite of plan and side section views showing another alternative geometric relationship of layers of internal structure of a novel conditioner showing an extended tab portion having a bifurcated overlapped portion of an A, B, or G conductor;

FIG. 20 is a composite of plan and side section views showing another alternative geometric relationship of layers of internal structure of a novel conditioner showing an extended tab portion having a bifurcated overlapped portion of a conductor, and varied lateral extensions of certain layers;

FIG. 21 is a composite of plan and side section views showing another alternative geometric relationship of non rectangular layers of internal structure of a novel conditioner showing an extended tab portion and a bifurcated overlapped portion of a conductor including two arcuate sections the concave portions of which face one another;

FIG. 22 is a composite plan and side section view showing another alternative geometric relationship of non rectangular layers of internal structure of a novel conditioner showing an extended tab portion and a bifurcated overlapped portion of a conductor including two arcuate sections the concave portions of which face one another, and varied lateral extensions of certain layers;

FIG. 23 is a perspective view of a sixth embodiment of internal structure of a novel conditioner, having a feed through configuration;

FIG. 24 is a side section view of the sixth embodiment viewed face on a section parallel to the left side shown in FIG. 23 and passing through the geometric center of the sixth embodiment;

FIG. 25 is a top side view of the sixth embodiment viewed face on from the top side shown in FIG. 23 with dielectric coating removed to expose internal structure;

FIG. 26 is a perspective view of a component having a metal layer of an A or B conductor on a dielectric plate of the sixth embodiment;

FIG. 27 is a perspective view of an A or B conductor component of the sixth embodiment;

FIG. 28 is a perspective view of an assembly of the elements shown in FIGS. 26 and 27;

FIG. 29 is a perspective view of a component having a metal layer of a G' conductor structure on a dielectric plate of the sixth embodiment;

FIG. 30 is a perspective view of components of G' conductor structure of the sixth embodiment;

FIG. 31 is an assembly of components of G conductor structure of the sixth embodiment;

FIG. 32 is a schematic showing a circuit including a conductive shielding structure substantially enclosing internal structure of conditioner, and a load with capacitive coupling of the G conductor to the conductive enclosure; and FIG. 33 is a schematic showing a circuit including a conductive shielding structure substantially enclosing internal structure of conditioner, and a load with conductive coupling of the G conductor to the conductive enclosure.

DETAILED DESCRIPTION OF THE EMBODIMENTS

Figure 1:
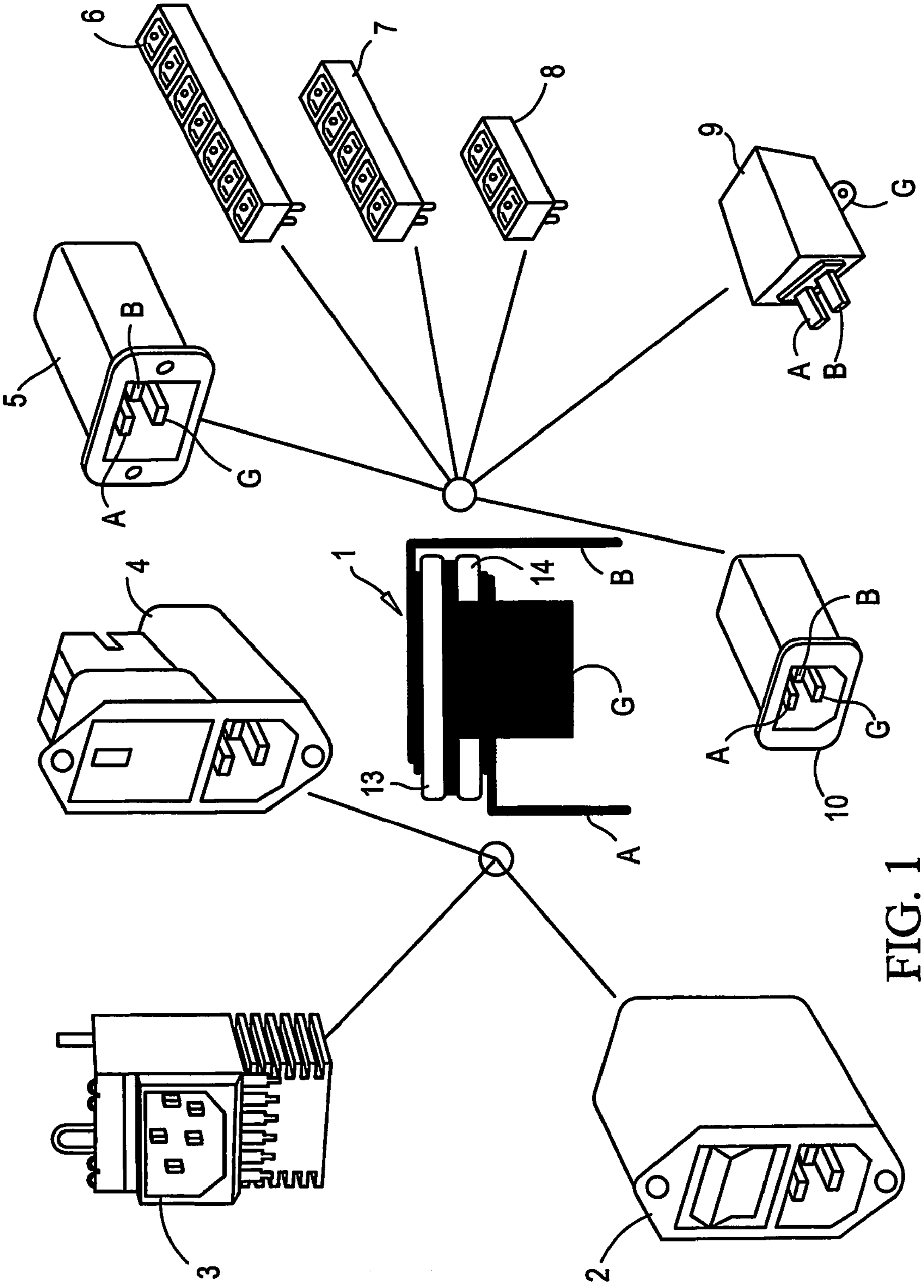
FIG. 1 is a composite view showing in a side view a first embodiment of internal structure of a novel conditioner having a bypass configuration and in perspective view external structure of various connectors in which the conditioner may reside.

FIG. 1 shows in side view a first embodiment of internal structure 1 of a novel conditioner and connectors 2-10 of which internal structure 1 may be a part.

Internal structure 1 includes an A conductor, a B conductor, a G conductor, electrically insulating (dielectric) slab 13, and dielectric slab 14. Opposing planar portions of the A and B conductors are separated from one another by a planar portion of the G conductor. Dielectric slabs 13, 14 are disposed between the opposing planar portions of the A, B, and G conductors.

Internal structure 1 resides inside of housings of any of connectors 2-10. Preferably, internal structure 1 resides inside of a conductive housing of any of connectors 2-10. In any case, the A and B conductors of internal structure 1 are electrically connected to corresponding non-ground male or female pins of any of connectors 2-10. Pins of connectors 5, 9, and 10 are labeled A, B, and G, respectively to show the correspondence of the pins to their conductive connections to the A, B, and G conductors. The G electrode of internal structure 1 is either capacitively or conductively connected to a ground pin as shown for connector 10 or capacitively or conductively connected to a conductive housing as shown for connector 9. Preferably, the G electrode is conductively connected, not capacitively connected.

FIG. 1 shows a part of the A conductor extending to the left beyond the lateral extent to the left of the G conductor (that is, beyond the end of the overlapped portion). The A conductor portion extending to the left beyond the extent of the G conductor defines a ninety degree bend and a portion past the bend that extends down. FIG. 1 shows a part of the B conductor extending to the right beyond the lateral extent to the right of the G conductor (that is, beyond the end of the overlapped portion) and defining a 90 degree bend to extend past the bend downward, before terminating. FIG. 1 shows a facing end of the G conductor that extends beyond a front edge of the A conductor and defining a 90 degree bend to extend downward, before terminating. FIG. 1 shows the extended or tab portion of the G conductor being narrower than an overlapped portion of the G conductor, but still relatively wide and flat. The tab portion of the G conductor has a width that is more than half the width of the overlapped portion of the G conductor in the layered structure. Although not apparent, the tab portions of the A and B conductors are narrower than the corresponding overlapped portions of the A and B conductors.

Internal structure 1 includes a rear tab portion of the G conductor (not shown) extending beyond a rear edge of the A conductor (that is, beyond the end of the overlapped portion) and also having a 90 degree bend. Each one of the A, B, and G conductors projects out of the layered structure at a different height along the layered structure, projects out at different directions from one another, and protrudes from different sides of the layered structure. In addition, no tab of the A conductor overlaps, in the direction perpendicular to the major surfaces of the layers of the layered structure, any tab of the B or G conductor. The tab portion of the G conductor does not have a circular cross section; it has a wide flat cross section. The tab portions of the A and B conductors also have wide and flat cross sections.

Not shown in FIG. 1 is dielectric material that covers, except at the tabs, the side surfaces of the portions of the A, B, and G conductors that form the layered structure. Also not shown is dielectric material that preferably covers the top surface of the B conductor and the bottom surface of the A conductor.

Figure 12:
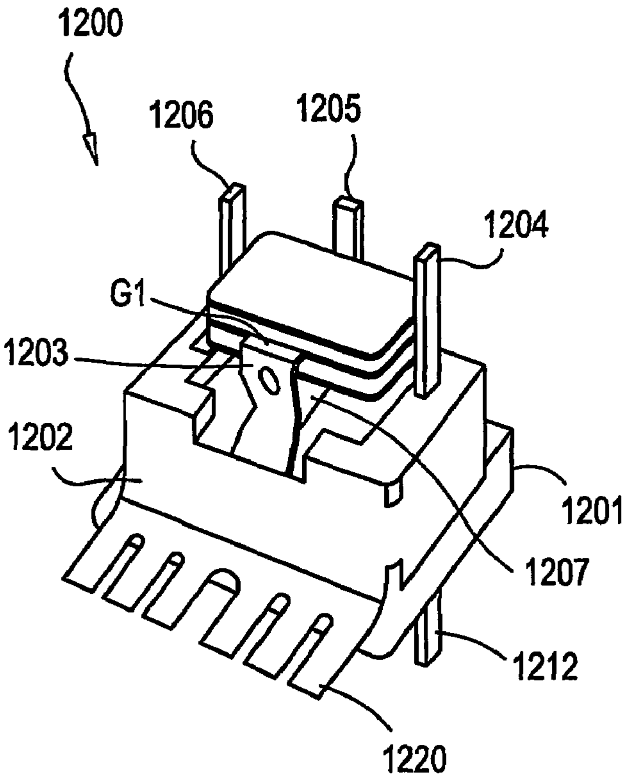
FIG. 12 is a perspective view of another prototype (having a structure similar to that shown for FIG. 9) mounted to an assembly structure of a first connector.
Figure 13:
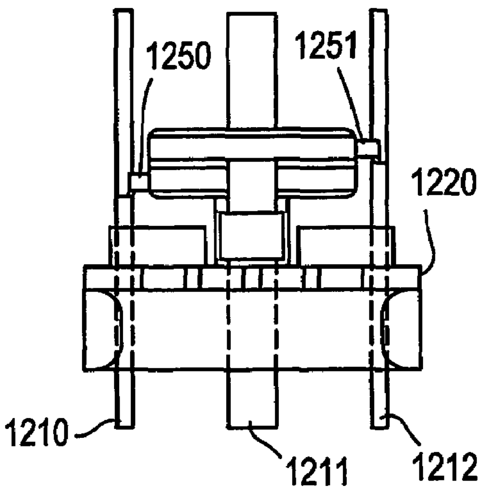
FIG. 13 is a side perspective view of the structure shown in FIG. 12.

In one preferred connector assembly, for example the connector assembly of connector 5, internal structure 1 is mounted to an assembly structure such as assembly structure 1200 described for FIGS. 12 and 13. An additional dielectric component is mounted on top of conductive elements 1206, 1205, 1204 and on top of internal structure 900A, for mechanical support and/or additional electrical isolation of conductors 1204, 1206. Conductors 1204, 1206 carry power and need to remain isolated from each other and from G conductor 1205 and the conductive housing or housings including conductive wrap 1202. An external conductive housing, such as the housing forming all but the front surface of conditioner 5 shown in FIG. 1, is slipped over the foregoing assembly, making physical contact and electrical contact with conductive wrap or housing 1202 shown in FIG. 12. The external conductive housing may make conductive contact, by pressure, screw, rivet, or solder, to either conductive element 1205 or a conductive element extending from conductive element 1205. The external conductive housing may also have a portion extending from one side to the other side of the hidden back surface of connector 5, passing thereby between extensions of conductive elements 1206, 1204, and electrically and preferably mechanically securing to either conductive element 1205 or a conductive element extending from conductive element 1205. This structure provides a conductive pathway connecting the G1 and G2 tabs that passes between conductive paths extending from the A and B conductors around the hidden back side of a connector like connector 5. This structure, also provides conductive paths that extend from the G1 tab to the G2 tab that pass around the conductive paths extending rom each one of the A and B conductors. This preferred embodiment also includes a ground strap 1207 (see FIG. 12) that provides a conductive path connecting the G1 tab to the G2 tab outside the overlapped structure. Ground strap 1207 extends between conductive paths of the A and B conductors on the side of the overlapped structure that extend to 1210, 1212 (see FIG. 13). Such an arrangement provides integration of the assembly and multiple points of electrical contact of the conductive element 1205 and the conductive wrap or housing 1202.

In one alternative, internal structure 1 is oriented in housings of connectors like connectors 2-10 such that the major surface of the layered structures of internal structure 1 are perpendicular to the extension of the male or female pins of the connector. In some of these embodiments, the bent portions of the tabs of the G conductor are sized to contact inner surfaces of a conductive housing of the connector, providing a pressure contact and some structural support of internal structure 1 in the connector. In some of these embodiments the bent portions of the tabs of conductors A, B, and G are disposed closer to rear ends of pins of the connectors than the planar layers of conductors A, B, and G, and the bent portions are soldered to back portions of corresponding pins.

Alternatively, any one or more of the A, B, and G conductors may define pin structures designed to mate with the rear sides of pins of the corresponding plug. This type of design enables the internal structure 1 to be plugged into the back side of the pin structure in a corresponding connector, thereby facilitating connector assembly. That is, the connector, such as a pug designed for 120 volt or 230 volt, contains an assembly which itself includes connectors to connect to the A, B, G conductors. In related alternative embodiments, additional conductive paths, such as conductive wires, whether or not insulated, may be used to electrically connect one or more of the A, B, and G electrodes to corresponding connector pins in the connector housing.

In many embodiments, after installation of internal structure 1 in a connector housing, the connector is "potted." That is, the connector structure is filled with resin or glue which then sets or is set to electrically isolate and mechanically secure in position various components. In all embodiments, it is preferable that the side surface of at least the A and B conductors forming the overlapped region be covered with a dielectric, except where tabs exist.

Preferably, the bent portions of the A, B, and G conductors maintain a relatively wide and flat cross section. Relatively wide and flat cross-sections of the A, B, and G conductors minimizes inductance in the A, B, and G conductors.

Figure 2:
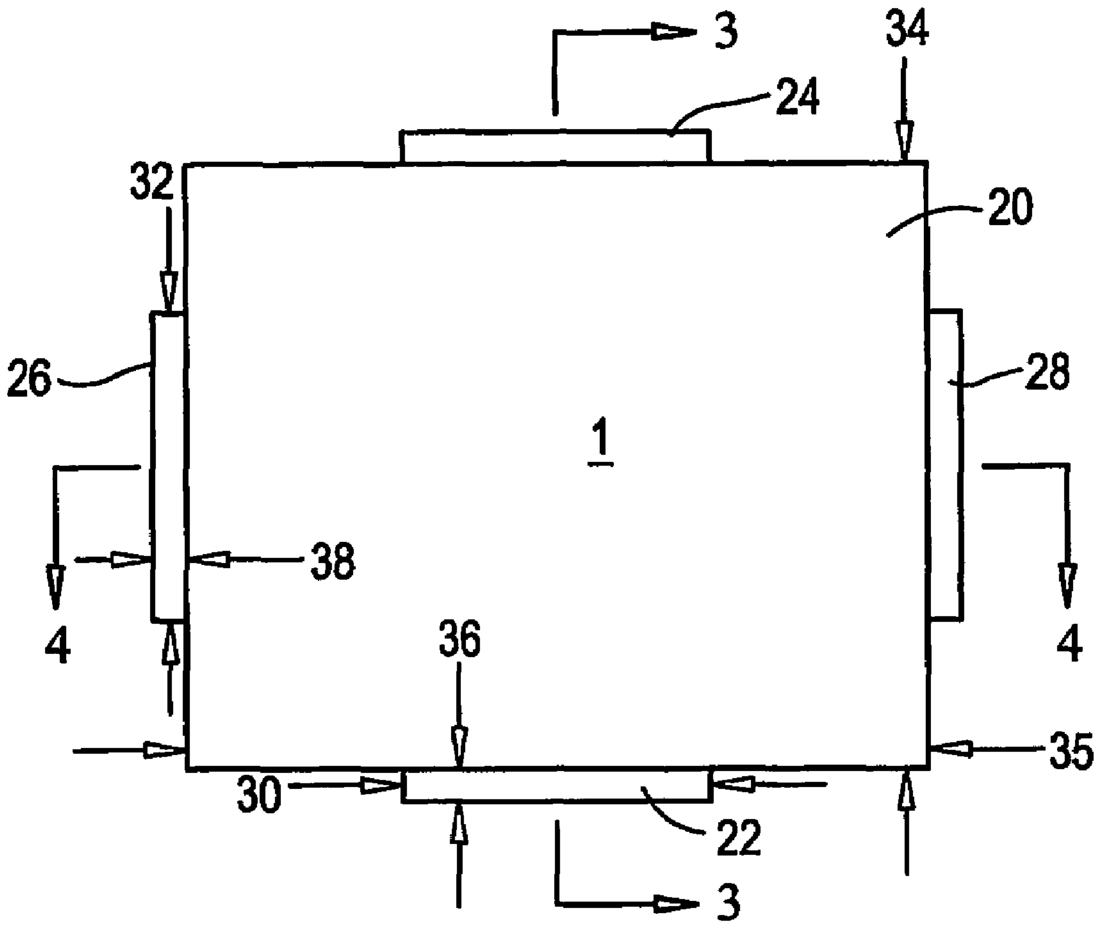
FIG. 2 is a top plan view of the internal structure of the conditioner of FIG. 1.

FIG. 2 shows in plan view internal structure 1 having upper surface 20, front top surface 22, and back top surface 24, which are the top surfaces of top portions of the G conductor, top surface 26, which is the top surface of the tab portion of the A conductor, top surface 28, which is the top surface of the tab portion of the B conductor.

Upper surface 20 is generally rectangular. Top surface 22 has width 30. Top surface 26 of the A conductor has width 32. Internal structure 1 has width 34 and length 35.

Preferable, widths 30, 32 are less than width 34. Preferably, widths 30, 32 are between 10 and 90 percent of width 34.

Top surface 22 has length 36 from the edge of upper surface 20. Top surface 26 has length 38 from the edge of upper surface 20.

Preferably, lengths 36, 38 are less than widths 30, 32. Preferably, lengths 36, 38 are less than one half length 34, preferably less than one fifth length 34, and more preferably less than one tenth length 34. As shown, lengths 36, 38 are about one twentieth of length 34.

Figure 3:
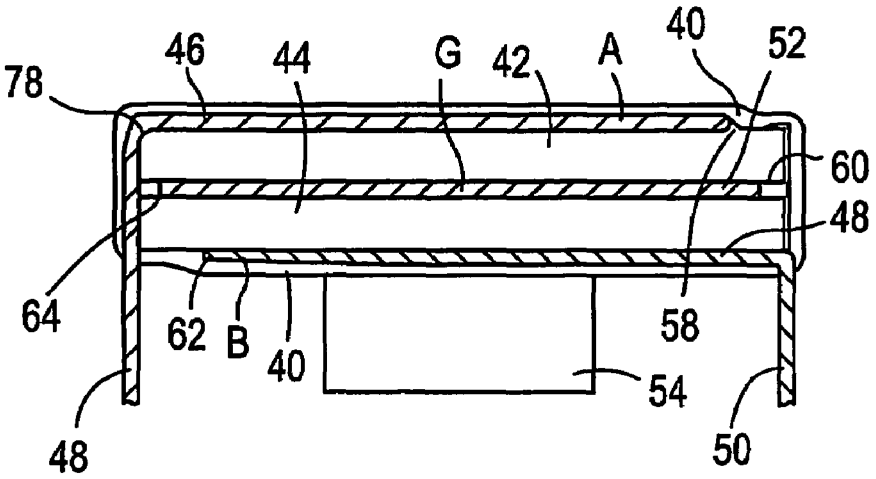
FIG. 3 is a side section along the line 4-4 in FIG. 3 of the structure of FIG. 1, with dielectric coating added.

FIG. 3 shows a cross section through the lines 4-4 in FIG. 2 and added external dielectric coating. FIG. 3 shows a layered structure including a sequence of layers from top to bottom of insulator 40, conductor A, insulator 42, conductor G, insulator 44, conductor B, and again insulator 40. Insulator 40 is an external dielectric coating.

Conductor A includes horizontally extended planar section 46 and vertically extended tab section 48.

Conductor B includes horizontally extended planar section 48 and vertically extended tab section 50.

Figure 4:
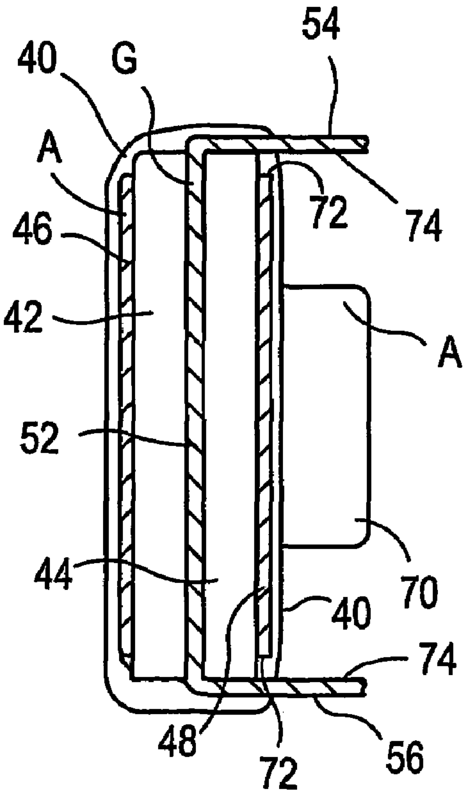
FIG. 4 is a side section along the line 3-3 in FIG. 3 of the structure of FIG. 1, with dielectric coating added.

Conductor G includes horizontally extended planar section 52, first vertically extended tab section 54, and second vertically extended tab section 56 (not shown in FIG. 3; see FIG. 4). Top of tab section 54 defines top surface 24 shown in FIG. 2. Top of tab section 56 defines top surface 22 shown in FIG. 2.

Horizontally extended planar section 46 terminates at B conductor planar edge 58. G conductor planar side surface edge 60 resides at a location in the plane of the layered structure beyond edge 58.

Horizontally extended planar section 48 terminates at edge 62. G conductor planar side surface edge 64 resides at a location in the plane of the layered structure beyond edge 62.

FIG. 4 shows in cross section through lines 3-3 in FIG. 2 internal structure 1 including added dielectric coating 40. FIG. 4 shows the sequence of layers, 40, 46, 42, 52, 44, 48, and 40, as in FIG. 3. FIG. 4 also shows downward projecting portion 70 of conductor A the top surface of which forms surface 26 in FIG. 2. Side edges 72,72 of horizontally extended planar section 48 do not extend to inner side surfaces 74, 74 of vertically extended portions of tab sections 54, 56, of the G conductor.

Figure 5:
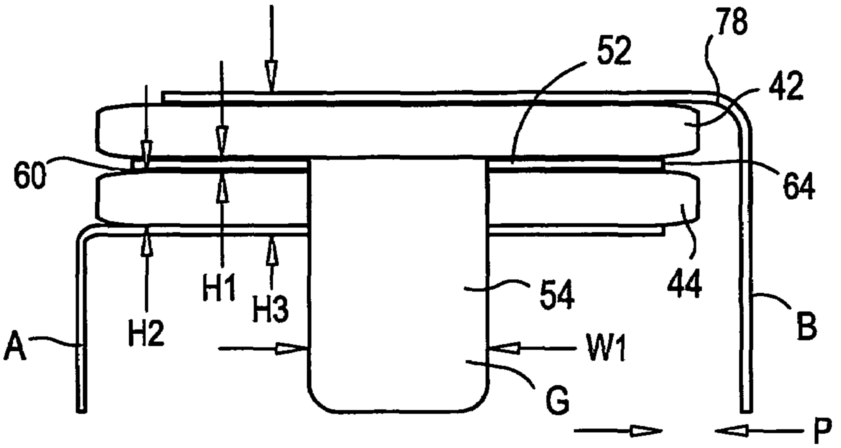
FIG. 5 is a side view of a second embodiment of internal structure of a conditioner having relatively narrow A and B conductors.

FIG. 5 is a side view of part of a second embodiment of internal structure of a conditioner having relatively narrow A and B conductors. FIG. 5 shows G conductor tab portion 54, G conductor horizontally extended planar section 52, the A and B conductors, and dielectric wafers or layers 42, 44. G conductor planar section 52 terminates at side edges 64, 60. The B conductor projects straight out of the layered structure to location 78 prior to substantially curving downward.

FIG. 5 also shows certain geometric relationships between section of the A, B, and G conductors and section forming the layered structure useful to define parameters general to all embodiments of internal structure of conditioners. FIG. 5 shows G conductor thickness or height H1, dielectric 44 height H2, and layered section height H3. FIG. 5 also shows G conductor tab section width W1. The B conductor projects straight out from the layered structure beyond the edge of the G conductor by B conductor projection distance P. Distance P is equal to the distance from the edge 64 of the G conductor to the location 78 to which the B conductor projects prior to having a substantial angle (for example greater than 20 degrees) out of the plane of the layered structure.

Preferably, the ratio of P to H1, or the ratio of P to the height of the B conductor layer is at least 1, 2, 5, 10, or 20. Preferably, the ratio of the length the G and A conductors project out past the end of the edges of the other conductive layers in the layered structure to the heights of the G and A conductors also is at least 1, 2, 5, 10, or 20.

Preferably, the ratio of P to H3 is at least one tenth, one eighth, one fourth, one half, one, 2, 4, or 6. Preferably, the ratio the length that the tabs of the G and A conductors project out past the edges of the other conductive layers of the layered structure to H3 is also at least one tenth, one eighth, one fourth, one half, one, 2, 4, or 6.

Preferably, the ratio of W1 to H1 is greater than 2, 4, 6, 8, 10, 20, or 30 such that the tab section of the G conductor is wide and flat. Preferably, the corresponding width to height ratios for the tabs of the A and B conductors are greater than 2, 4, 6, 8, 10, 20, or 30.

Preferably, dielectric material, which may be provided by potting or coating, exists between (that is, blocking line of site) any portion of any tab of any of the A, B, and G conductors and any portion of the layered structure of any other conductor. Preferably, dielectric material between any portion of any tab of any of the A, B, and G conductors and any portion of the layered structure of any other conductor has sufficient dielectric strength to prevent dielectric break down between the A and B conductors, and to prevent dielectric breakdown between the A and G or the B and G conductors during normal operation. Normal operation in this context means, for connectors designed for 120 volt 60 cycle operation, normal load conditions of 120 volt and 60 cycle operation. Normal operation means in this context, for connectors designed for operation at other voltages or frequencies, normal load conditions for those other voltages and frequencies. In this context, the applicants realize that there are a myriad of different connector specification designed for different normal load conditions. Dielectric strength depends of course on normal operating conditions. Therefore, no set combination of dielectric materials and thicknesses thereof will cover all embodiments. However, for purposes of definiteness, note that such dielectric coatings may be at least 10 microns thick, at least 0.1 millimeters thick, or at least 1 millimeter thick.

As used herein, the term dielectric generally refers to a material having a solid form, and not to air.

For the reasons just presented with respect to a potting or exterior dielectric coating of the layered structure, the thicknesses of dielectric wafers or layers 42, 44 depend upon application specifications, and are limited to thicknesses sufficient to prevent dielectric breakdown as specified by normal operating conditions. However, again for purposes of definiteness, dielectric wafers 42, 44 may be at least 10 microns thick, at least 0.1 millimeters thick, or at least 1, 2, 3, 4, or 5 millimeters thick The thickness of dielectrics 42, 44 also specifies a distance along the direction perpendicular to the surfaces of the layered structure separating the heights of tab portions of the A, B, and G conductors. Thus, these conductors may each be separated in height from adjacent conductors by at least 10 microns, at least 0.1 millimeters, or at least 1, 2, 3, 4, or 5 millimeters. Tab portions of A and B conductors are separated in height from one another by at least twice those distances.

Figure 6:
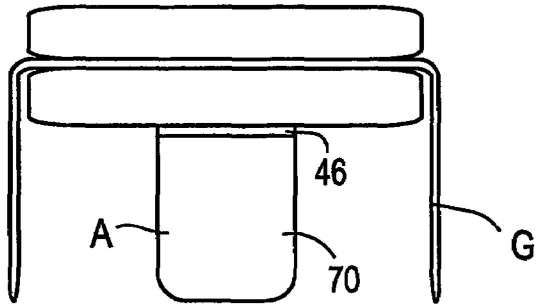
FIG. 6 is a side view of the left hand side shown in FIG. 5.

FIG. 6 is another side view of the same part of a second embodiment showing the horizontally extended planar section 46 and vertically extended tab section 48 of the A conductor have the same width, and the width of the A conductor being substantially less than the width of the G conductor.

Figure 7:
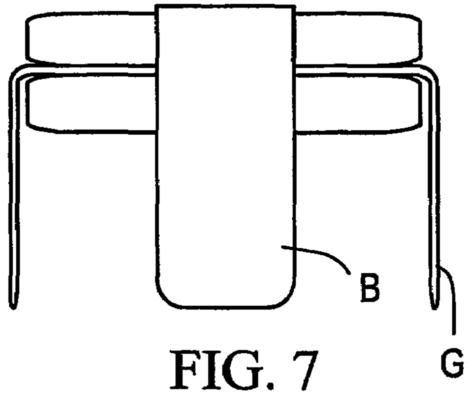
FIG. 7 is a side view of the right hand side shown in FIG. 5.

FIG. 7 shows another side view of the same part of a second embodiment exposing the B conductor and showing that the B horizontally extended planar section 48 and vertically extended tab section 50 of the B conductor also have the same width, and that width is substantially less than the width of the G conductor.

Figure 8:
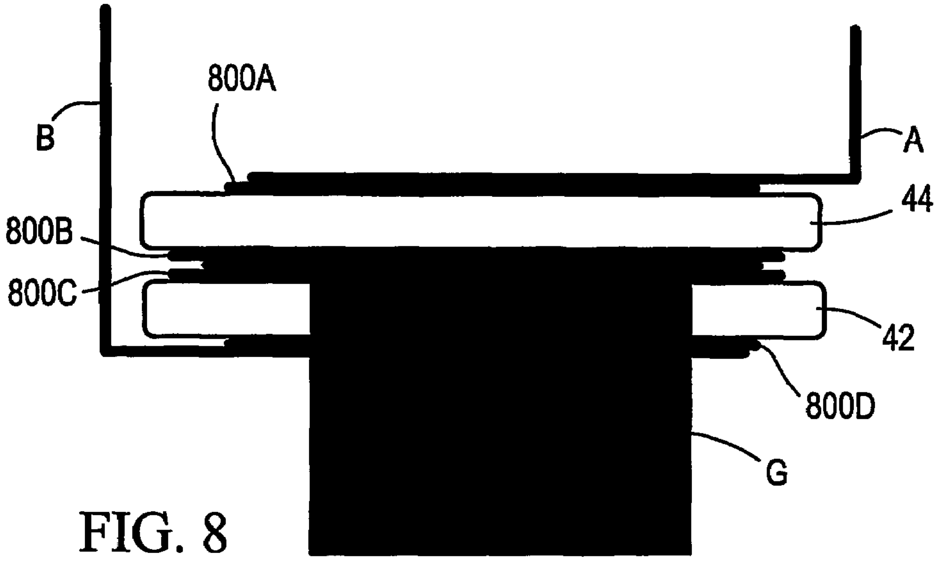
FIG. 8 is a side view of third embodiment of internal structure of a conditioner, and also showing certain metallization layer details.

FIG. 8 is a side view of third embodiment of part of internal structure of a conditioner which is similar to the first and second embodiments. The third embodiment differs from the first two in the following respects. First, it shows the tabs of the G conductor bent to extend in the opposite direction as the bends in the tabs in the A and B conductors. Second, it shows in black for additional emphasis, sub layers 800A, 800B, 800C, and 800D, of the A, B, and G conductors.

Sub layers 800A, 800B, 800C, and 800D are metallization layers. That is, they are layers deposited upon dielectric slabs or layers 42, 44. Sub layer 800A forms part of the A conductor. Sub layers 800B and 800C form part of the G conductor. Sub layer 800D forms part of conductor B. In methods of making embodiments wherein non integral components are assembled, sub layers 800A, 800B, 800C, and 800D provide a surface to which surfaces of assembly components of the A, B, and G conductors can wet, thereby making a reliable and uniform physical and electrical integration.

Figure 9:
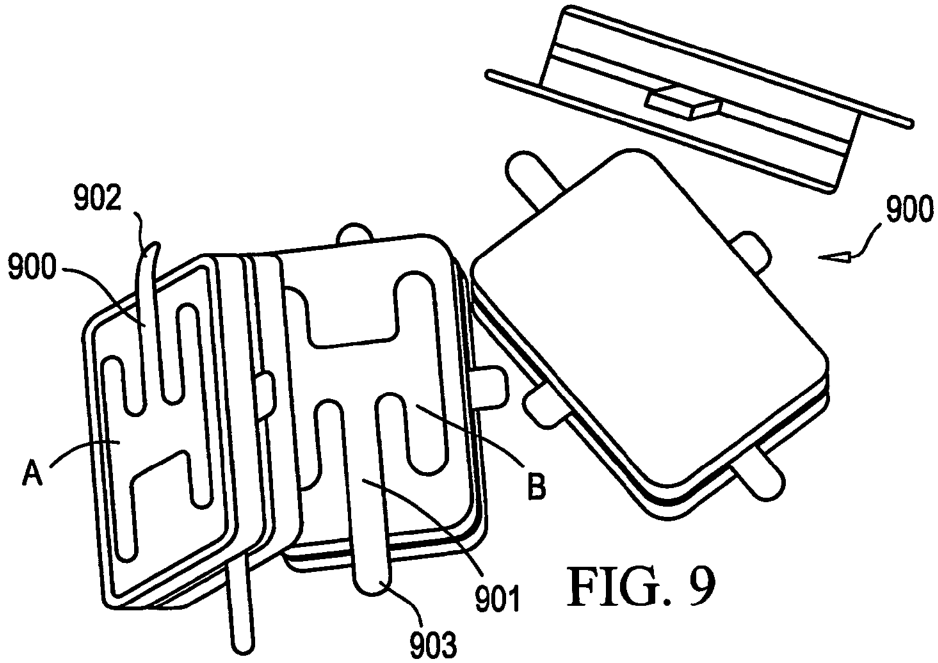
FIG. 9 is a drawing of pictures showing perspective and section views of an actual prototype of a third embodiment of internal structure of a conditioner.

FIG. 9. shows in perspective and section views an unpotted prototype 900 of a third embodiment. The third embodiment includes A and B conductors having generally "H" shaped portions in the layered structure. Each one of the A and B conductors also includes a portion 900, 901 extending from the cross-bar portion of the "H" shape out beyond the termination of the layered portion to define tab portion 902, 903.

Figure 10:
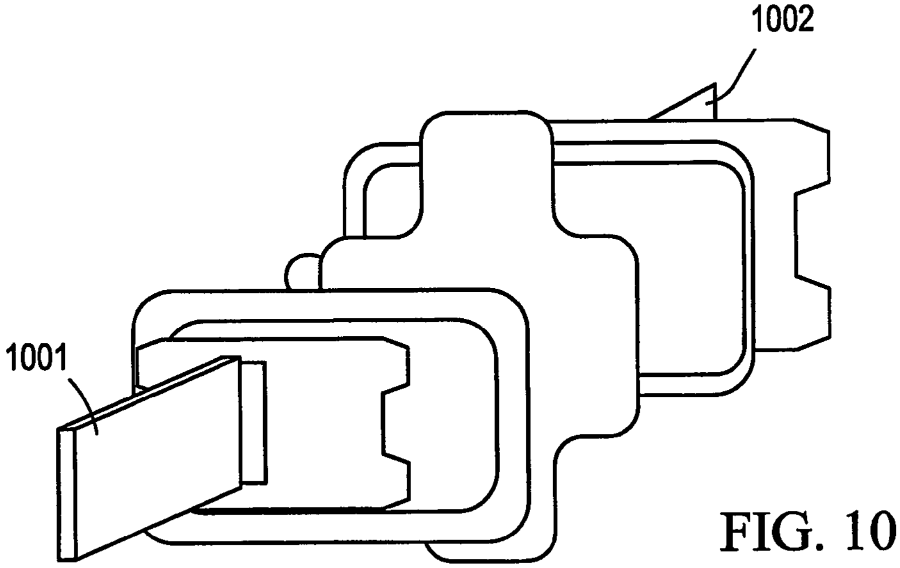
FIG. 10 is a exploded schematic view of internal structure of a fourth embodiment similar to the FIG. 9 embodiment, but also showing A and B conductor tab portions projecting away from a layered structure.

FIG. 10 shows an exploded view of a fourth embodiment in which tab portions 1001, 1002 of the A and B conductors are soldered to the outside exposed surfaces of each of the A and B conductors. FIG. 10 also shows a modified shallow "H" shape for the A and B conductor layers in which the length of the cross-bar portion of the "H" shape is greater than eighty percent the length of the two posts of the "H" shape.

The extension of the A and B tabs away from opposite sides of the structure enables the layered portion of the G conductor to extend in all directions beyond the extent of the layered portions of the A and B conductors. Preferably, the planar portion of the G conductor extends beyond the edge of the A and B conductors at least 1, more preferably at least 2, 10, or 20 times the spacing between the G and A or the G and B conductors.

Figure 11:
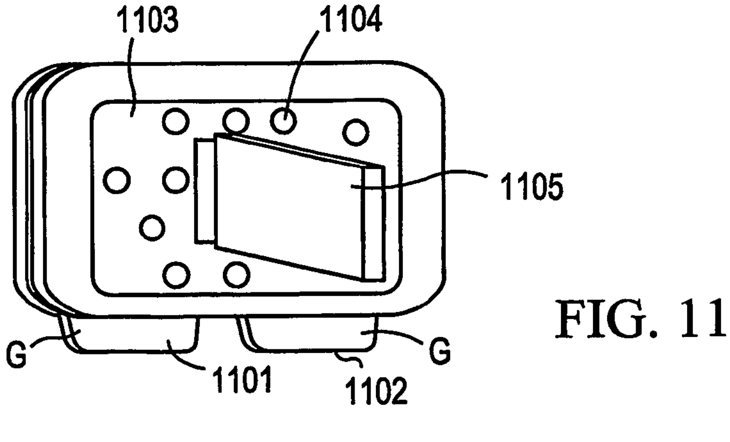
FIG. 11 is a perspective view of a fifth embodiment of internal structure of a conditioner showing holes in metallization layers, and two G tabs protruding from the same side of a layered structure.

FIG. 11 shows a fifth embodiment of internal structure wherein both tabs 1101, 1102 of the G conductor project from the same side of a layered structure. In addition, this embodiment includes an A conductor tab 1105 that is soldered to metallized surface 1103 of the A conductor. FIG. 11 shows the majority of the A conductor's upper surface formed by a metallized layer as opposed to an assembled metal component. FIG. 11 illustrates what may be a beneficial property for all metallized layers, which are small apertures in the metallization. The existence of small apertures in the metallized layer may promote reliable and secure, for example by soldering, bonding of metal components to the metallization layer.

FIG. 12 is a perspective view of prototype 900A mounted to an assembly structure 1200 of a first connector. Assembly structure 1200 includes dielectric housing 1201 substantially inset into metal wrap or housing 1202. Metal wrap or housing 1202 includes an extension 1203 extending toward tab G1 of the G conductor of prototype 900A. Metal wrap or housing 1202 includes flanged portion 1220. Metal wrap or housing 1202 also defines apertures through which extend conductive elements 1204, 1205, 1206. Conductive elements 1204, 1205, 1206 extend through metal wrap or housing 1202 to form at the lower ends connector male pins 1210, 1211, 1212 (see FIG. 13). Conductive elements 1204, 1206 are conductively isolated from metal wrap or housing 1202.

FIG. 12 also shows ground strap 1207. Ground strap 1207 is electrically connected to or near the base of extension 1203. Ground strap 1207, back side tab G2 of the G conductor, and conductive element 1205 are electrically connected together near the back side of prototype 900A. However, that connection is hidden from view by prototype 900A. Ground strap 1207 is preferably close to the bottom surface of prototype 900A, provides a very low resistance conductive path between the G1 and G2 tabs, and provides very little cross sectional area in the loop formed by ground strap 1207 and the G conductor. FIG. 12 also shows a bottom portion of connector male pin 1212.

FIG. 13 is a side perspective view of the structure shown in FIG. 12. FIG. 13 show connector male pins 1210, 1211, 1212 extending through apertures in metal wrap or housing 1202. FIG. 13 also clearly shows conductive elements 1204, 1206, contacting tabs 1250, 1251 of the A and B conductors, and shows those tabs at different elevations in prototype 900A.

Importantly, the ground strap passes from the G1 tab to the G2 tab without enclosing any conductive paths connecting to either the A or B conductor. The ground strap in this example is about 3 millimeters wide and about one fifth the width of prototype 900A between the tabs of the A and B conductors, and spaced between about 1 and 2 millimeters from the dielectric bottom surface of prototype 900A.

Preferably, the cross sectional area defined by the cross section of the ground strap 1207 and the G conductor is less than 20 square millimeters, preferably less than 10 square millimeters, and more preferably less than 5 square millimeters. Preferably, the ground strap's path does not project more than 10 millimeters, preferably not more than 5 millimeters, and more preferably not more than about 1 millimeter from an outer major surface of the A or B conductive layers of the layered structure.

In one alternative embodiment, a second ground strap connects the G1 and G2 tabs along a path above the top of the prototype 900A. That is, two ground strap to G conductor loops exist with one circling above the internal structure of the conditioner and one circling below the internal structure of the conditioner.

Figure 14:
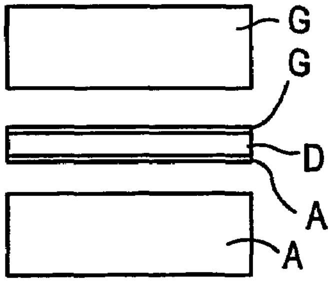
FIG. 14 is a composite of plan and side section views showing one alternative geometric relationship of a component having layers useful in internal structure of a novel conditioners, in which certain layers have the same lateral extension.

FIG. 14 shows top plan, side, and bottom plan views of a component layered structure. At the top, FIG. 14 shows in plan view a surface of a conductive layer G forming part of a G conductor. At the bottom, FIG. 14 shows in plan view a bottom surface of conductive layer A forming part of an A or B conductor. In the middle, FIG. 14 shows in side section view the same layers disposed on opposing sides of dielectric wafer or layer D. The three layer assembly shown in FIG. 14 may be used as part of an assembly of internal structure of a conditioner, as generally discussed for FIG. 16A-C below.

Figure 15:
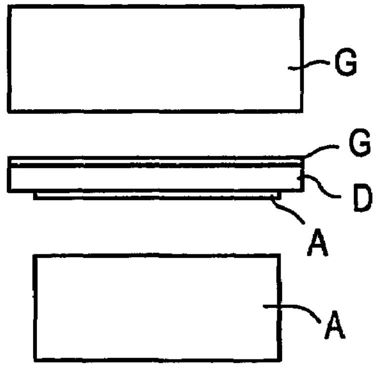
FIG. 15 is a composite of plan and side section views showing another alternative geometric relationship of a component having layers useful in internal structure of a novel conditioners, in which certain layers have different but symmetric lateral extensions.

FIG. 15 is similar to FIG. 14. FIG. 15 shows at the top, in plan view, top surface of a metallization layer forming part of a G conductor. FIG. 15 shows, at the bottom, in plan view, a bottom surface of a metallization layer forming part of an A or B conductor. FIG. 14 also shows in the center, a side view of those elements deposited on a dielectric wafer or layer D. FIG. 15 differs from FIG. 14 in that the A conductor's layer does not extend to either of the side edges of the dielectric D, and the G conductor's layer does extend to both of the side edges of the dielectric D. Alternatively, the G conductor layer's lateral edges may not extend to the side edges of the dielectric D. Preferably, the side edges of the metallization forming part of the G conductor extend laterally further than the side edges of the metallization forming part of the A conductor.

FIG. 16A shows in side section two component structures 1601, 1602 used in one method of making internal structures of a novel conditioner, in which lateral extension of metallization layers forming part of A, B, and G conductors differ from one another.

FIG. 16A shows component structure 1601 having metallization layers 1610, 1611, and major planar surfaces of dielectric wafer or layer D. Side edges of metallization layer 1611 and dielectric D are coextensive. Metallization layer 1610 has right side edge terminating at the same location as the termination of the right side edge of dielectric D. Metallization layer 1610 has left side edge 1613 terminating to the right of left side edge 1614 of dielectric D such that there is an extension 1615 of dielectric D not covered by metallization 1610.

FIG. 16B is a side section view showing component structures of a novel conditioner in which metallization layers forming part of a G conductor structure extends to certain side surfaces. FIG. 16B shows a G conductor metallization layer including horizontally extended planar section 1620 layered on a bottom side of dielectric D, and the G conductor metallization including metallization 1621 extending vertically along a side wall of dielectric D. An A or B conductor metallization layer 1622 resides on a top planar surface of dielectric D. Layer 1622 has left and right side edges spaced apart from metallization 1621 of the G conductor by uncoated surface areas 1623, 1624 of the dielectric D. Metallization 1621 extending vertically along a side wall of dielectric D may further reduce electromagnetically coupling the A and B conductors. Metallization layer 1621 may extend along the side wall only part of the way towards the surface of the dielectric D upon which resides layer 1622.

FIG. 16C shows an exploded assembly side section view of four component structures 1630, 1640, 1650, 1660 used in one method of making internal structures of a novel conditioner. FIG. 16C shows: component 1630 including metallization layer 1631 on a top surface of dielectric D1 and metallization layer 1632 on a bottom surface of dielectric D1; component 1640 including metallization layer 1641 on a top surface of dielectric D2 and metallization layer 1642 on a bottom surface of dielectric D2; component 1650 including metallization layer 1651 on a top surface of dielectric D3 and metallization layer 1652 on a bottom surface of dielectric D3; and component 1660 including metallization layer 1661 on a top surface of dielectric D4 and metallization layer 1662 on a bottom surface of dielectric D4.

In one method of fabricating an A, B, G structure, an additional A conductor component including a tab portion is inserted between layers 1661 and 1652 such that a tab portion of the additional A conductor component projects out to the left side of FIG. 16C, an additional B conductor component is inserted between layers 1632 and 1641 such that a tab portion of the additional B conductor component projects out to the right hand side of FIG. 16C, and an additional G conductor component is inserted between layers 1642 and 1651 such that tab portions project out of and into the paper in the view of FIG. 16C. Termination 1633 of metallization layer 1632 spaced from the edge 1634 of dielectric D1 helps ensure that the resulting A conductor does not conductively connect or flash over to G conductor structure. A similar structure providing an uncoated end region 1665 of dielectric D4 helps ensure that the resulting B conductor does not conductively connect or flash over to G conductor structure.

In one method of fabricating the additional conductive components and the components 1630, 1640, 1650, and 1660, they are assembled with the positioning just indicated, preferably via heating so that the metallization layers wet to each other and to the additional conductive components with which the are placed in conductive contact to form physically integrated structure having, as the conductive components, the A, B, and G conductors. Preferably, the G conductor extends to the left as shown in FIG. 16C beyond the extension of the A conductor, and the G conductor extends to the right as shown in FIG. 16C beyond the extension of the B conductor.

Preferably, the additional conductive structures are substantially thicker than the metallization layers.

FIG. 16C also shows uppermost conductive layer 1631 and lowermost conductive layer 1662. These layers are optional additional metal layers. Layers 1631 and 1662 may be conductively connected to no other conductive structure, to provide additional shielding of the A, B, and G conductors. Alternatively, layers 1631 and 1632 may be conductively connected to the G structure. Layers 1631 and 1632 may be conductively connected to the G conductor by a conductive band looping around internal structure of a conditioner. For example, for a conditioner integrated from the assembly shown in FIG. 16C, such a band would loop out of the page, over the top, under the bottom, and connect behind the page. At the top and bottom, that band would contact and conductively connect to portions of surfaces 1631 and 1662. An embodiment including a band similar to that just described appears in FIGS. 23-25. Alternatively, additional layers 1631 and 1632 may be conductively connected, for example, via solder, to tab portions of the G conductor structure.

FIG. 17 is a composite of plan and side section views showing another alternative geometric relationship of layers of a component of a layered structure for internal structure of a novel conditioner. FIG. 17 generally indicates that component layers of the layered structure can have non-rectangular, such as elliptical or circular shapes.

FIG. 17 illustrates an elliptical configuration of a component 1700 of an internal structure of a novel conditioner including top layer G of a G conductor, dielectric wafer or layer D, and bottom A layer of an A or B conductor. FIG. 17 shows the side edges of the A, D, and G layers terminate at the same extent on the left and right sides. Preferably, the A and G layers are metallizations deposited on dielectric D.

FIG. 18 illustrates another elliptical configuration of a component 1800 of an internal structure of a novel conditioner including top layer G of a G conductor, dielectric wafer or layer D, and bottom A layer of an A or B conductor. FIG. 18 shows the G layer extending to the same edge locations as dielectric D. FIG. 18 shows the A layer not extending to any edge of the dielectric layer D. Alternatively, one or more portions of the A layer may extend to the edge of the dielectric D.

FIG. 19 illustrates another configuration of a component 1900 and a tab component 1901. The top of FIG. 19 illustrates in plan view a metallized G portion of a G conductor. The middle of FIG. 19 show a component structure including the G portion, dielectric D, and an A layer of an A or B conductor. The bottom of FIG. 19 shows in bottom plan view, an tab component 1901 on the A layer such that it is conductively contacted to the A layer. Tab component 1901 includes a tab portion extending to tab end 1906, relatively narrow tab component arm portions 1903 and 1902 spaced apart from one another and extending over a substantial length of the A layer, and relatively wide tab component ends 1904, 1905.

FIG. 20 illustrates another configuration of a component 2000 and a tab component 2001. FIG. 20 shows structure that is the same as in FIG. 19, except that the A layer edge 2002 does not extend to any side edge 2003 of the dielectric D.

FIG. 21 illustrates another alternative configuration of a component 2100 and a tab component 2101. FIG. 20 is similar to FIG. 19, except that it show tab component arms 2102, 2103 forming crescent or partial "C" shapes.

FIG. 22 illustrates another alternative configuration of a component 2200 and a tab component 2201. FIG. 22 is similar to FIG. 20, except that it show tab component arms 2202, 2203 forming crescent or partial "C" shapes. As in FIG. 20, the conductive A layer has edges that do not extend to any edge of the dielectric D.

FIG. 23 shows a sixth embodiment 2300 of internal structure of a novel conditioner in which A, B, and G' conductors each extend beyond the overlapped or layered structure. In this type of structure the A and B conductors may form paths in series with power or signals propagating from a source or control generator to a load. That is, conductive circuit lines may connect between a source and one end of an A conductor on one side of structure 2300 and between a load and the other end of the A conductor on an opposite side of structure 2300. FIG. 23 does not show the dielectric coating surrounding the conductive layers. However, the dielectric coating or potting exists in complete functional structures, as with the previously described embodiments.

FIG. 23 shows structure 2300 including A, B, and G' conductors, conductive surface 1631, and conductive band 2305. The A conductor has a top tab portion 2303, a bottom tab portion 2304, and a central portion within the overlapped or layered structure. The B conductor includes top tab portion 2301, bottom tab portion 2302, and a central portion within the overlapped or layered structure. The G' conductor includes left side ground frame portion 2306, right side ground frame portion 2307, and G conductor portions (not shown in FIG. 23) including tab portions connected through the layered structure conductively connecting ground frame portions 2306 to 2307. Conductive band 2305 connects to the ground frame portions 2306, 2307, to conductive outer layer 1631, and to a corresponding conductive outer layer on a rear side of structure 2300. FIG. 23 also shows parts 2310, 2310 of circular or elliptical layers of the layered structure of structure 2300.

FIG. 24 is a side section view passing through A and B conductors showing layer sequence in the layered structure of structure 2300. The sequence in the layered structure is similar to that shown for FIG. 16C. That is, each dielectric wafer or layer D1, D2, D3, D4 has a metallization on each of its major surfaces, as indicated by metallization layers 2320-2325, and 1662, 1631.

FIG. 24 also shows in side section G conductor portion 2330. G conductor portion 2330 may be initially an integral part of ground frame portions 2306, 2307, or it may be a separate elongated piece of conductive material.

FIG. 24 also shows a dielectric coating or potting 2350 enclosing all structure except top and bottom tab portions of the A and B conductors and top and bottom portions of ground frame portions 2306, 2307. In this respect, the sixth embodiment differs from prior embodiments in that conductive material of the G conductor that projects straight out of the layered structure is encased in dielectric material, the only material conductively connected to the G conductor that projects out of dielectric are the ground frame portions 2306, 2307, and the ground frame portions 2306, 2307 extend in the dielectric in a direction perpendicular to the plane formed by the layered structure.

In one alternative, the ground frame portions 2306, 2307 may be rotated 90 degrees from their orientation shown in FIG. 23 to be parallel with a line perpendicular to the major surfaces of the layered structure.

One alternative to the sixth embodiment has the A and B conductors offset relative to one another such that their tab sections have not overlap along the direction perpendicular to the major surfaces of the layered structure. Another alternative has the A and B conductors canted relative to one another such that the A and B conductor tab sections do not project out of the layered structure in the same direction as one another. Moreover, the actual dimensions and shapes of the left side ground frame portion 2306 and right side ground frame portion 2307 are not critical, so long as they both conductively connect to the G conductor. Conductive band 2305 is preferred but optional. External conductive layers 1631, 1662 are optional. Conductive band 2305 need not conductively contact conductive layers 1631, 1662. Although preferable, conductive band 2305 need not conductively contact ground frame portions 2306, 2307. Preferably, conductive band 2305 is at least substantially capacitively coupled to ground frame portions 2306, 2307. In embodiments with no conductive band, ground frame portions 2306, 2307 should be large enough, and/or capacitively coupled or conductively connected to substantial additional conductive material, to provide a sufficient source or sink of charge for a specified level of energy conditioning. Dimensions shown in FIG. 23 are believed to be suitable for providing suitable level of energy conditioning for many uses.

FIG. 25 show a top plan view of structure 2300 with dielectric or potting 2350 stripped away to expose underlying elements. FIG. 25 shows top edges of A, B, and G conductors, contact ground frame portions 2306, 2307, and conductive band 2305.

Preferably, the structure 2300 of FIGS. 23-25 is substantially enclosed in a conductive housing or enclosure, and that conductive housing or enclosure is conductively connected to the G' structure. Preferably, the conductive enclosure is conductively connected to the conductive band 2305, preferably uniformly around the outer surface of the conductive band, and/or to both ground frame portions 2306, 2307. The conductive enclosure may have a single aperture through which pass both conductive pathways that connect to A and B tabs 2302, 2304. Preferably, the conductive enclosure has a separate aperture for each one of the conductive pathways that connect to A and B tabs 2302, 2304, which feature provides conductive material of the conductive enclosure between the conductive pathways connected to the A and B tabs 2302, 2304. The feature of having material of the conductive enclosure between the conductive pathways connected to the A and B tabs 2302, 2304, provides a conductive pathway outside the overlapped region and between the two tabs of the G conductor. The conductive enclosure may include conductive contacts to conductive layers 1631, 1662. The conductive band 2305 and/or the conductive housing provides paths between the two tabs of the G conductor that are outside the overlapped region and that do encircle conductive paths including both the A and the B conductors.

FIGS. 26-31 show parts useful in one method of making structure 2300.

FIG. 26 shows a electrode pattern structure 2600 having a circular or elliptical A or B metallization 2605 on a surface 2601 of a dielectric, and dielectric side wall 2602. Metallization pattern 2600 generally does not extend to edges of surface 2601, except at to extension portions 2603, 2604.

FIG. 27 shows A conductor lead frame 2700. Lead frame 2700 includes a top tab portion 2303, a bottom tab portion 2304 (see FIG. 23) and ring shaped center portion 2701. The B conductor may have a structure identical or similar to that of the A conductor.

FIG. 28 shows an assembly consisting of A conductor lead frame 2700 on layer 2605 of electrode pattern structure 2600. These layers may be conductively and mechanically integrated by soldering or conductively pasting.

FIG. 29 shows a electrode pattern structure 2900 having a circular or elliptical G metallization 2901 on a surface 2902 of a dielectric, and dielectric side wall 2903. Metallization pattern 2900 generally does not extend to edges of surface 2902, except at extension portions 2904, 2905.

FIG. 30 shows G' conductor structures 3000 including contact ground frame portions 2306, 2307, tab portions 3010, 3011, and C shaped portions 3020, 3021.

FIG. 31 shows an assembly consisting of G' conductor structures 3000 on electrode pattern structure 2900. Note that C shaped portions 3020, 3021, preferably reside entirely on metallization 2901. C shaped portions 3020, 3021 may or may not abut one another. However, C shaped portions are necessarily conductively connected to one another for example by conductive connection through metallization layer 2901 or by additional conductive material there between, such as solder or electrically conductive paste.

The foregoing embodiments and alternatives illustrate many variations in A, B, and G conductor shape, overlap relationship, and orientation. The inventors recognize that most of these alternatives are compatible with one another. For example generally rectangular and generally elliptical layers may be used in the same conditioner structure, and A, B, and G conductor layer shapes may vary from the generally rectangular and generally elliptical, so long as the desired overlap of the A, B, and G conductors exists, and the G conductor has at least two tab portions. Moreover, tab portions may project away from the overlapped or layered structures at angles that are not perpendicular to the surfaces or edges of the layered structure, for example at angles between about 15 and 89 degrees from the surface or edges of the overlapped or layered structures.

FIG. 32 shows a circuit including a conductive structure 3201 including wall 3202, source 3203, load 3204, internal structure of conditioner 3210, additional conductive structure AA, A conductor tab A, B conductor tab B, G conductor tab G, source and return power lines 3205, 3205, and load lines 3206, 3206. Source and return power lines 3205, 3205 extend wall 3202 of conductive enclosure 3201 and are conductively isolated from conductive enclosure 3201. Lines 3205, 3206 contact respective A and B tabs of internal structure of conditioner 3210. Lines 3206, 3206 connect between respective tabs of internal structure of conditioner 3210 and load 3204. Tab G of a G conductor of conditioner 3210 is conductively connected to a conductive area AA, and conductive area AA is capacitively (that is, not conductively) connected to conductive structure 3201. Conductive structure 3201 substantially, and preferably entirely encloses load 3204, conditioner 3210, and conductive area AA, except for non-conductive apertures in structure 3201 through which pass lines 3205, 3205.

FIG. 33 shows a circuit similar to the circuit shown in FIG. 32. The only difference from the FIG. 32 circuit is that G tab of the G conductor of the internal structure of the conditioner is conductively connected to conductive structure 3201.

The invention claimed is:

1. An energy conditioner comprising:

an A conductor including an A overlap portion and an A1 tab, wherein said A overlap portion has A major surfaces and A side edges between said A major surfaces;

a B conductor including a B overlap portion and a B1 tab, wherein said B overlap portion has B major surfaces and B side edges between said B major surfaces;

a G conductor including a G overlap portion, a G1 tab, and a G2 tab;

at least one dielectric material;

wherein said A overlap portion, said B overlap portion, and said G overlap portion define an overlap region;

wherein said G overlap portion is between said A overlap portion and said B overlap portion;

wherein said A overlap portion, said B overlap portion, and said G overlap portion are conductively isolated from one another in the overlap region;

said G conductor is conductively isolated from said A conductor and said B conductor; and wherein said at least one dielectric material covers side edges of said A overlap portion and said B overlap portion.

2. The conditioner of claim 1 wherein said A conductor has no other tab than said A tab.

3. The conditioner of claim 2 wherein said B conductor has no other tab than said B tab.

4. The conditioner of claim 3 wherein said G conductor has no other tabs than said G1 tab and said G2 tab.

5. The conditioner of claim 1:

wherein said A tab has an A tab substantially flat surface at the region where said A tab extends out of said overlap region; and wherein said A tab substantially flat surface is covered by said at least one dielectric material where said A tab extends out of said overlap region.

6. The conditioner of claim 1 wherein said A overlap portion, said B overlap portion, and said G overlap portion define a layered structure.

7. The conditioner of claim 1 further comprising a first outside conductive path, said first outside conductive path being outside said overlap portion, said first outside conductive path connecting said G1 tab to said G1 tab, wherein said first outside conductive path has a first outside conductive path cross section, and said first outside conductive path cross section is not circular.

8. The conditioner of claim 1 wherein said G1 tab extends out of said overlap region in a G1 tab direction, said A1 tab projects out of said at least one dielectric material in an A1 tab direction, said B1 tab projects out of said at least one dielectric material in a B1 tab direction, and said G1 tab direction is different than both said A1 tab direction and said B1 tab direction.

9. The conditioner of claim 8 wherein said G1 tab direction is different from each of said A1 tab direction and said B1 tab direction by at least forty five degrees.

10. The conditioner of claim 1 wherein said A1 tab, said B1 tab, and said G1 tab are located at different positions along a overlap direction perpendicular to said A major surfaces such that said different positions have no overlap along said overlap direction.

11. The conditioner of claim 1 wherein portions of said A1 tab, said B1 tab, said G1 tab, and said G2 tab that are not coated or potted with dielectric are sufficiently spaced apart to prevent dielectric breakdown, or flash-over, in air, when 120 volt 60 cycle power is applied across said A1 tab and said B1 tab.

12. The conditioner of claim 11 wherein portions of said A1 tab, said B1 tab, and said G1 tab, that are not coated with dielectric are spaced from one another by at least 3 millimeters.

13. The conditioner of claim 1 wherein:

each tab has a cross section having a cross section height and a cross section width;

said overlap region defines an overlap direction perpendicular to said A major surfaces, said cross section head measured along said overlap direction;

each tab has a width measured in a direction parallel to a plane defined by said A major surface and perpendicular to a direction along which the tab projects from said overlap region;

each cross section of said A1 tab and said B1 tab has a width to height ratio of at least 2.

14. The conditioner of claim 13 wherein each cross section of said A1 tab and said B1 tab has a width to height ratio of at least 6.

15. The conditioner of claim 13 wherein each cross section of said A1 tab, said B1 tab, and said G1 tab has a width to height ratio of at least 10.

16. The conditioner of claim 1 wherein said A conductor includes an A2 tab, and said A1 tab and said A2 tab protrude from said overlap region on opposite sides of said overlap region.

17. A connector comprising the conditioner of claim 1, wherein:

said connector comprises an A pin structure, a B pin structure, and a conductive housing;

said A pin structure includes a male or female pin and a first A conductive path extending to and conductively contacting said A1 tab;

said B pin structure includes a male or female pin and a first B conductive path extending to and conductively contacting said B1 tab; and said conductive housing substantially encloses said A conductor, said B conductor, said G conductor, and at least a portion of said A pin structure and said B pin structure.

18. The connector of claim 17, wherein:

a first outside conductive path outside said overlap region connects said G1 tab to said G2 tab.

19. A method of making an energy conditioner comprising:

providing an A conductor including an A overlap portion and an A1 tab, said A overlap portion has A major surfaces, A side edges between said A major surfaces;

providing a B conductor including a B overlap portion and a B1 tab, said B overlap portion has B major surfaces, and B side edges between said B major surfaces;

providing a G conductor including a G overlap portion, a G1 tab, and a G2 tab;

providing at least one dielectric material;

wherein said A overlap portion, said B overlap portion, and said G overlap portion define an overlap region;

wherein said G overlap portion is between said A overlap portion and said B overlap portion in said overlap region;

wherein said A overlap portion, said B overlap portion, and said G overlap portion are conductively isolated from one another in the overlap region;

wherein said G conductor is conductively isolated from said A conductor and said B conductor; and wherein said at least one dielectric material covers side edges of said A overlap portion and said B overlap portion.

20. A method of using an energy conditioner, said conditioner comprising:

an A conductor including an A overlap portion and an A1 tab, said A overlap portion has A major surfaces, A side edges between said A major surfaces;

a B conductor including a B overlap portion and a B1 tab, said B overlap portion has B major surfaces, and B side edges between said B major surfaces;

a G conductor including a G overlap portion, a G1 tab, and a G2 tab;

at least one dielectric material;

wherein said A overlap portion, said B overlap portion, and said G overlap portion define an overlap region;

wherein said G overlap portion is between said A overlap portion and said B overlap portion in said overlap region;

wherein said A overlap portion, said B overlap portion, and said G overlap portion are conductively isolated from one another in the overlap region;

wherein said G conductor is conductively isolated from said A conductor and said B conductor; and wherein said at least one dielectric material covers side edges of said A overlap portion and said B overlap portion, said method comprising:

transmitting electrical signals or electrical power to said A conductor and said B conductor.

* * * * *